United States Patent
Kim et al.

(10) Patent No.: US 8,598,741 B2
(45) Date of Patent: Dec. 3, 2013

(54) PHOTOVOLTAIC AND FUEL CELL HYBRID GENERATION SYSTEM USING SINGLE CONVERTER AND SINGLE INVERTER, AND METHOD OF CONTROLLING THE SAME

(75) Inventors: Jin Wook Kim, Seoul (KR); Byoung Kuk Lee, Gyunggi-do (KR); Jong Soo Kim, Gyunggi-do (KR); Gyu Yeong Choe, Gyunggi-do (KR); Jong Sun Kim, Gyunggi-do (KR); Il Woon Lee, Gyunggi-do (KR); Jae Sun Won, Gyunggi-do (KR); Jong Hae Kim, Gyunggi-do (KR); Dong Seong Oh, Incheon (KR)

(73) Assignees: Samsung Electro-Mechanics Co, Ltd., Suwon, Gyungg-Di (KR); Sungkyunkwan University Foundation for Corporate Collaboration, Suwon, Gyungg-Di (KR)

( * ) Notice: Subject to any disclaimer, the term of this patent is extended or adjusted under 35 U.S.C. 154(b) by 838 days.

(21) Appl. No.: 12/643,092

(22) Filed: Dec. 21, 2009

(65) Prior Publication Data

US 2010/0156185 A1    Jun. 24, 2010

(30) Foreign Application Priority Data

Dec. 23, 2008  (KR) .................. 10-2008-0132663
Nov. 26, 2009  (KR) .................. 10-2009-0115332

(51) Int. Cl.
*H02J 1/00*    (2006.01)

(52) U.S. Cl.
USPC ................................................ 307/72

(58) Field of Classification Search
USPC ..................... 307/72; 322/9; 700/291
See application file for complete search history.

(56) References Cited

U.S. PATENT DOCUMENTS

2005/0002214 A1* 1/2005 Deng et al. .................. 363/131
2005/0275386 A1* 12/2005 Jepsen et al. ..................... 322/9
2006/0062034 A1* 3/2006 Mazumder et al. ........... 363/131

(Continued)

FOREIGN PATENT DOCUMENTS

| JP | 06-266455 A | 9/1994 |
|---|---|---|
| JP | 2002-199592 A | 7/2002 |
| JP | 2003-250222 A | 9/2003 |
| KR | 10-2008-0077161 A | 8/2008 |

OTHER PUBLICATIONS

Reddy, K.N.; Agarwal, V.; , "Utility-Interactive Hybrid Distributed Generation Scheme With Compensation Feature," Energy Conversion, IEEE Transactions on , vol. 22, No. 3, pp. 666-673, Sep. 2007.*

(Continued)

*Primary Examiner* — Daniel Cavallari
(74) *Attorney, Agent, or Firm* — Lowe Hauptman & Ham, LLP

(57) ABSTRACT

There are disclosed a photovoltaic and fuel cell (PV-FC) hybrid generation system using a single converter and a single inverter, and a method of controlling the same. The PV-FC hybrid generation system includes a DC/DC converter unit converting an FC output voltage from a fuel cell, converting chemical energy into electrical energy, into a preset voltage, a DC link unit commonly connecting an output terminal of a photovoltaic cell, converting the sunlight into electrical energy, and an output terminal of the DC/DC converter unit, and linking the converted FC output voltage from the DC/DC converter unit with a PV output voltage from the photovoltaic cell to thereby generate a DC voltage, and a DC/AC inverter unit converting the DC voltage from the DC link unit into a preset AC voltage. Furthermore, a method of controlling the PV-FC hybrid generation system is proposed.

35 Claims, 14 Drawing Sheets

(56) References Cited

U.S. PATENT DOCUMENTS

2008/0013347 A1* 1/2008 Deng et al. ................. 363/49
2009/0067202 A1* 3/2009 Ichikawa et al. ............ 363/79
2009/0076661 A1* 3/2009 Pearson et al. ............ 700/291

OTHER PUBLICATIONS

Korean Office Action Application No. 10-2009-0115332 issued Mar. 11, 2011.

* cited by examiner

PHOTOVOLTAIC AND FUEL CELL HYBRID GENERATION SYSTEM USING SINGLE CONVERTER AND SINGLE INVERTER, AND METHOD OF CONTROLLING THE SAME

CROSS-REFERENCE TO RELATED APPLICATIONS

This application claims the priority of Korean Patent Application Nos. 10-2008-0132663 filed on Dec. 23, 2008 and 10-2009-0115332 filed on Nov. 26, 2009, in the Korean Intellectual Property Office, the disclosures of which are incorporated herein by reference.

BACKGROUND OF THE INVENTION

1. Field of the Invention

The present invention relates to a photovoltaic and fuel cell hybrid generation system (hereinafter "PV-FC hybrid generation system"), and a method of controlling the same, and more particularly, to a PV-FC hybrid generation system using a single converter and a single inverter, which achieves a reduction in the number of costly converters and inverters required, and a method of controlling the same.

2. Description of the Related Art

Since the late $20^{th}$ century, the demand for developing renewable energy sources has increased due to the depletion of fossil fuels, and the environmental pollution and global warming associated with $CO_2$, $NO_x$ and $SO_x$ emissions. Notably, the demand for renewable energy technology has recently increased sharply due to soaring international oil prices and greenhouse gas reductions obligated by the Kyoto protocol. Thus, matters regarding current energy resources are linked directly to national security, and the volition and technology to reduce $CO_2$ emissions are considered to significantly affect a nation's competitiveness.

Among a variety of renewable energy sources, solar cells (i.e., photovoltaic cells: PV), despite low efficiency, are expanding their domestic market share due to their features as clean energy and their advantages conforming with Korean domestic semiconductor technologies. In overseas markets, the commercialization of photovoltaic generation systems, led by Japan and German, has been completed based on those countries' long-term accumulated technical skills and financial abilities.

However, photovoltaic cells have the following limitations: generating power only in the daytime, working as intermittent generation sources dependent upon environmental conditions such as cloud cover and rain, and having the very low maximum efficiency of approximately 10% to 15%. For this reason, photovoltaic cells for home use are utilized only during the daytime, and the commercial power grid supplies power at night and under environmental limitations.

To prevent the above limitations, hybrid generation systems, such as PV-Battery, PV-Wind, PV-Diesel or PV-FC hybrid systems, are under development mainly in the world's leading technological nations. It is therefore currently considered important for nations to take the lead in hybrid power generation system technologies and markets.

However, PV-Battery hybrid systems are disadvantageous in that a battery is not a power generation device, but rather a secondary cell having a short useful lifespan that causes pollution during the manufacturing and discarding process.

PV-Wind hybrid systems also have disadvantages in that a wind power generation source is an intermittent power generation source that is dependent upon environmental conditions, and is not suitable for home use due to its restrictions in terms of installation space and noise. As for PV-Diesel hybrid systems, a fossil fuel needs to be used and this places a limit on its development into an ultimate future power generation system.

A PV-FC hybrid system is considered to be the most competitive generation system as a future hybrid generation source due to the following reasons: this hybrid generation system uses hydrogen and oxygen as fuel, both of which are infinite clean energy sources, conforming with the hydrogen economy society at which the government is aiming, has sufficiently high generation efficiency (35% to 80% in Combined Heat and Power (CHP)), and utilizes a fuel cell that is capable of constant power generation. In the PV-FC hybrid system, a fuel cell constantly generates power so as to maintain a basic load, and PV power is supplied to the grid during the daytime. Thereafter, water is subjected to electrolysis using surplus PV power to thereby generate hydrogen, and the generated hydrogen is used as the fuel of the fuel cell. Consequently, the PV-FC hybrid system can advantageously serve as ultimate eco-friendly infinite energy sources.

However, due to the different output characteristics of the photovoltaic and fuel cells, the PV-FC hybrid system has a 2CON-2INV structure including two converters and two inverters, namely, PV and FC converters and PV and FC inverters. This results in increases in manufacturing cost and size, obstructing the realization of a practical hybrid generation system.

SUMMARY OF THE INVENTION

An aspect of the present invention provides a PV-FC hybrid generation system using a single converter and a single inverter, capable of achieving a reduction in the number of costly converters and inverters being used so that the size and manufacturing cost can be reduced and efficient system configuration is realized, and a method of controlling the same.

According to an aspect of the present invention, there is provided a photovoltaic and fuel cell (PV-FC) hybrid generation system including: a DC/DC converter unit converting an FC output voltage from a fuel cell, converting chemical energy into electrical energy, into a preset voltage; a DC link unit commonly connecting an output terminal of a photovoltaic cell, converting the sunlight into electrical energy, with an output terminal of the DC/DC converter unit, and linking the converted FC output voltage from the DC/DC converter unit with a PV output voltage from the photovoltaic cell to thereby generate a DC voltage; and a DC/AC inverter unit converting the DC voltage from the DC link unit into a preset AC voltage.

According to another aspect of the present invention, there is provided a photovoltaic and fuel cell (PV-FC) hybrid generation system including: a DC/DC converter unit converting an FC output voltage from a fuel cell, converting chemical energy into electrical energy, into a preset voltage; a DC link unit commonly connecting an output terminal of a photovoltaic cell, converting the sunlight into electrical energy, and an output terminal of the DC/DC converter unit, and linking the converted FC output voltage from the DC/DC converter unit with a PV output voltage from the photovoltaic cell to thereby generate a DC voltage; a DC/AC inverter unit converting the DC voltage from the DC link unit into a preset AC voltage; a voltage/current detection unit detecting a voltage and a current generated by each of the fuel cell, the photovoltaic cell and the DC/AC inverter unit; and a hybrid generation control unit controlling the operations of the DC/DC converter unit and the DC/AC inverter unit on the basis of a plurality of voltages and currents detected by the voltage/current detection unit.

In the above aspects of the present invention, the DC link unit may include a capacitor connected between the ground and a common connection node to which the output terminal of the photovoltaic cell and the output terminal of the DC/DC converter unit are commonly connected.

The DC/AC inverter unit may include: a DC/AC inverter converting the DC voltage from the DC link unit into a pulsed voltage; a filter converting the pulsed voltage from the DC/AC inverter into the AC voltage; and a grid transmitter transmitting the AC voltage from the filter to a grid.

In the another aspect of the present invention, the voltage/current detection unit may detect the FC output voltage and current of the fuel cell, the PV output voltage and current of the photovoltaic cell, the AC voltage and output current of the DC/AC inverter unit, and a grid voltage from a grid of a commercial power supply.

The hybrid generation control unit may include: a converter controller controlling an operation of the DC/DC converter unit by using the grid voltage, and the FC output voltage and current; and an inverter controller controlling an operation of the DC/AC inverter unit on the basis of the PV output voltage and current from the voltage/current detection unit.

In a grid-connected operation mode, the converter controller and the inverter controller may each determine a photovoltaic generation status according to PV power based on the PV output voltage and current of the photovoltaic cell, and perform one of preset first and second grid-connected control modes according to the determined photovoltaic generation status regarding whether or not photovoltaic generation is carried out. The first grid-connected control mode may be a control mode in which photovoltaic generation is not carried out in the grid-connected operation mode, and the second grid-connected control mode may be a control mode in which photovoltaic generation is carried out in the grid-connected operation mode.

The converter controller may include: a first calculation part calculating a first control error value for constant power control with respect to the DC/DC converter unit in the first grid-connected control mode; a first control value compensation part compensating a converter control value by using the first control error value from the first calculation part; and a first PWM control part generating a PWM converter control signal by using the compensated converter control value from the first control value compensation part, and controlling an operation of the DC/DC converter unit by using the PWM converter control signal.

The inverter controller may include: a second calculation part calculating a second control error value for DC link, grid connection and output current control with respect to the DC/AC inverter unit in the first grid-connected control mode; a second control value compensation part compensating an inverter control value by using the second control error value from the second calculation part; and a second PWM control part generating a PWM inverter control signal by using the compensated inverter control value from the second control value compensation part, and controlling an operation of the DC/AC inverter unit by using the PWM inverter control signal.

According to an aspect of the present invention, there is provided a method of controlling a photovoltaic and fuel cell (PV-FC) hybrid generation system having a DC/DC converter unit converting an FC output voltage from a fuel cell into a preset voltage, a DC link unit linking the converted FC output voltage from the DC/DC converter unit with a PV output voltage from the photovoltaic cell to thereby generate a DC voltage, and a DC/AC inverter unit converting the DC voltage from the DC link unit into a preset AC voltage, the method including: a system start operation in which a voltage and current required to determine whether or not a grid connection is made and photovoltaic generation is carried out are detected; a grid-connected photovoltaic generation determining operation in which a grid-connected operation mode is performed when the grid connection is available, and a photovoltaic generation status regarding whether or not photovoltaic is carried out is determined by comparing PV power calculated from the PV output voltage and output current of the photovoltaic cell with a preset minimum PV power; a first grid-connected control operation in which a first grid-connected operation mode is performed when it is determined in the grid-connected photovoltaic generation determining operation that photovoltaic generation is not carried out in the grid-connected operation mode, the first grid-connected operation mode including a converter control operation in which constant power is controlled with respect to the DC/DC converter unit, and an inverter control operation in which DC link, grid connection and output current are controlled with respect to the DC/AC inverter unit; and a second grid-connected control operation in which a second grid-connected operation mode is performed when it is determined in the grid-connected photovoltaic generation determining operation that photovoltaic generation is carried out in the grid-connected operation mode, the second grid-connected operation mode including a converter control operation in which constant power is controlled with respect to the DC/DC converter unit, and an inverter control operation in which maximum power point tracking (MPPT), DC link, grid connection and output current are controlled with respect to the DC/AC inverter unit.

According to another aspect of the present invention, there is provided a method of controlling a photovoltaic and fuel cell (PV-FC) hybrid generation system having a DC/DC converter unit converting an FC output voltage from a fuel cell into a preset voltage, a DC link unit linking the converted FC output voltage from the DC/DC converter unit with a PV output voltage from the photovoltaic cell to thereby generate a DC voltage, and a DC/AC inverter unit converting the DC voltage from the DC link unit into a preset AC voltage, the method including: a system start operation in which a voltage and current required to determine whether or not a grid connection is made and photovoltaic generation is carried out are detected; an operation mode determining operation in which it is determined whether an operation mode is a grid-connected operation mode or a stand-alone operation mode according to a grid voltage; a grid-connected photovoltaic generation determining operation in which, when the grid-connected operation mode is performed, a photovoltaic generation status regarding whether or not photovoltaic generation is carried out is determined by comparing preset minimum PV power with PV power calculated from the PV output voltage and output current of the photovoltaic cell; a stand-alone photovoltaic generation determining operation in which, when the stand-alone operation mode is performed, the photovoltaic generation status is determined by comparing the preset minimum PV power with the PV power of the photovoltaic cell; a first grid-connected control operation in which a first grid-connected operation mode is performed when it is determined in the grid-connected photovoltaic generation determining operation that photovoltaic generation is not carried out in the grid-connected operation mode, the first grid-connected operation mode including a converter control operation in which constant power is controlled with respect to the DC/DC converter unit, and an inverter control operation in which DC link, grid connection and output current are controlled with respect to the DC/AC inverter unit; a second grid-connected control operation in which a second grid-connected operation mode is performed when it is determined in the grid-connected photovoltaic generation determining operation that photovoltaic generation is carried out in the grid-connected operation mode, the second grid-connected operation mode including a converter control operation in which constant power is controlled with respect to the DC/DC converter unit, and an inverter control operation in which maximum power point tracking (MPPT), DC link, grid connection and output current are controlled with respect to the DC/AC inverter unit; a first stand-alone control operation in which a first stand-alone operation mode is performed when it is determined in the stand-alone photovoltaic generation determining operation that photovoltaic generation is carried out in the stand-alone operation mode, the first stand-alone operation mode including a converter control operation in which a current is controlled with respect to the DC/DC converter unit, and an inverter control operation in which maximum power point tracking (MPPT), DC link and output current are controlled with respect to the DC/AC inverter unit; and a second stand-alone control operation in which a second stand-alone operation mode is performed when it is determined in the stand-alone photovoltaic generation determining operation that photovoltaic generation is not carried out in the stand-alone operation mode, the second stand-alone operation mode including a converter control operation in which DC link is controlled with respect to the DC/DC converter unit, and an inverter control operation in which an output constant voltage is controlled with respect to the DC/AC inverter unit.

In the above aspects of the present invention, an FC output voltage and current of the fuel cell, a PV output voltage and current of the photovoltaic cell, an AC voltage and output current of the DC/AC inverter unit, and a grid voltage of a grid of a commercial power supply may be detected in each of the system start operation, the operation mode determining operation, the grid-connected photovoltaic generation determining operation, the stand-alone photovoltaic generation determining operation, the first grid-connected control operation and the second grid-connected control operation. The FC output voltage and current of the fuel cell, the PV output voltage and current of the photovoltaic cell, and the AC voltage and output current of the DC/AC inverter unit may be detected in each of the first stand-alone control operation and the second stand-alone control operation.

The converter control operation of the first grid-connected control operation may include: a first calculation operation in which a first control error value for constant power control with respect to the DC/DC converter unit is calculated; a first control value compensation operation in which a converter control value is compensated by using the first control error value from the first calculation operation; and a first PWM control operation in which a PWM converter control signal is generated by using the converter control value compensated in the first control value compensation operation, and an operation of the DC/DC converter unit is controlled by using the PWM converter control signal.

The inverter control operation of the first grid-connected control operation may include: a second calculation operation in which a second control error value for DC link, grid connection and output current control with respect to the DC/AC inverter is calculated; a second control value compensation operation in which an inverter control value is compensated by using the second control error value from the second calculation operation; and a second PWM control operation in which a PWM inverter control signal is generated by using the inverter control value compensated in the second control value compensation operation, and an operation of the DC/AC inverter unit is controlled by using the PWM inverter control signal.

The converter control operation of the second grid-connected control operation may include: a first calculation operation in which a first control error value for constant power control with respect to the DC/DC converter unit is calculated; a first control value compensation operation in which a converter control value is compensated by using the first control error value from the first calculation operation; and a first PWM control operation in which a PWM converter control signal is generated by using the converter control value compensated in the first control value compensation operation, and an operation of the DC/DC converter unit is controlled by using the PWM converter control signal.

The inverter control operation of the second grid-connected control operation may include: a second calculation operation in which a second control error value for maximum power point tracking (MPPT), DC link, grid connection and output current control with respect to the DC/AC inverter unit is calculated; a second control value compensation operation in which an inverter control value is compensated by using the second control error value from the second calculation operation; and a second PWM control operation in which a PWM inverter control signal is generated by using the inverter control value compensated in the second control value compensation operation, and an operation of the DC/AC inverter unit is controlled by using the PWM inverter control signal.

In the another aspect of the present invention, the converter control operation of the first stand-alone control operation may include: a first calculation operation in which a first control error value for current control with respect to the DC/DC converter unit is calculated; a first control value compensation operation in which a converter control value is compensated by using the first control error value from the first calculation operation; and a first PWM control operation in which a PWM converter control signal is generated by using the converter control value compensated in the first control value compensation operation, and an operation of the DC/DC converter unit is controlled by using the PWM converter control signal.

The inverter control operation of the first stand-alone control operation may include: a second calculation operation in which a second control error value for MPPT, DC link and output constant voltage control with respect to the DC/AC inverter unit is calculated; a second control value compensation operation in which an inverter control value is compensated by using the second control error value from the second calculation operation; and a second PWM control operation in which a PWM inverter control signal is generated by using the inverter control value compensated in the second control value compensation operation, and an operation of the DC/AC inverter unit is controlled by using the PWM inverter control signal.

The converter control operation of the second stand-alone control operation may include: a first calculation operation in which a first control error value for DC link control with respect to the DC/DC converter unit is calculated; a first control value compensation operation in which a converter control value is compensated by using the first control error value from the first calculation operation; and a first PWM control operation in which a PWM converter control signal is generated by using the converter control value compensated in the first control value compensation operation, and an operation of the DC/DC converter unit is controlled by using the PWM converter control signal.

The inverter control operation of the second stand-alone control operation may include: a second calculation operation in which a second control error value for output constant voltage control with respect to the DC/AC inverter unit is calculated; a second control value compensation operation in which an inverter control value is compensated by using the second control error value from the second calculation operation; and a second PWM control operation in which a PWM inverter control signal is generated by using the inverter control value compensated in the second control value compensation operation, an operation of the DC/AC inverter unit is controlled by using the PWM inverter control signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
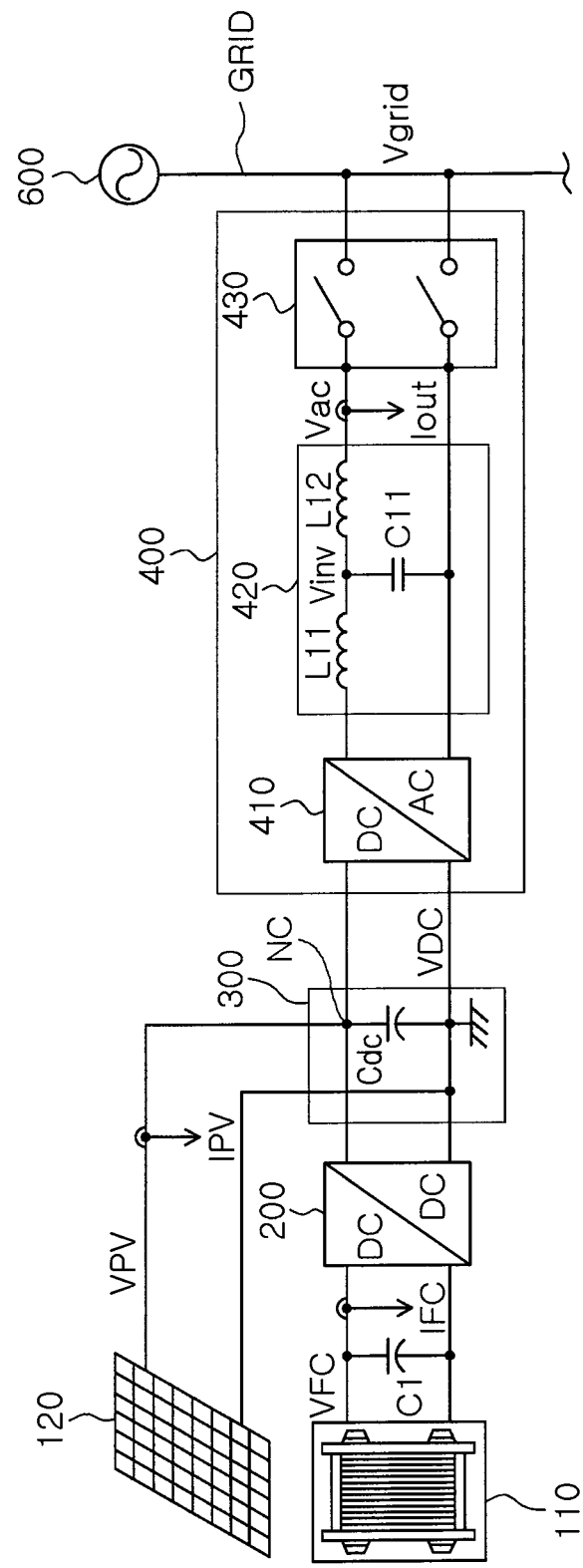
FIG. 1 is a circuit block diagram illustrating a PV-FC hybrid generation system using a single converter and a single inverter, according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals in the drawings denote like elements.

FIG. 1 is a circuit block diagram illustrating a PV-FC hybrid generation system using a single converter and a single inverter according to an exemplary embodiment of the present invention.

Referring to FIG. 1, a PV-FC hybrid generation system, according to this embodiment, may include a DC/DC converter unit 200, a DC link unit 300, and a DC/AC inverter unit 400. Here, the DC/DC converter unit 200 converts an FC output voltage VFC from a fuel cell 110, which converts chemical energy into electrical energy, into a preset voltage. The DC link unit 300 commonly connects an output terminal of a photovoltaic cell (i.e., solar cell) 120, which converts the sunlight into electrical energy, with an output terminal of the DC/DC converter unit 200, and links the converted FC output voltage VFC from the DC/DC converter unit 200 with a PV output voltage VPV from the photovoltaic cell 20 to thereby generate a DC voltage VDC. The DC/AC inverter unit 400 may convert the DC voltage VDC from the DC link unit 300 into a preset AC voltage Vac.

Here, the fuel cell 110 converts chemical energy into electrical energy having a predetermined magnitude by using a reduction-oxidation reaction between hydrogen and oxygen.

The photovoltaic cell 120 distinguishes between the time when there is sunlight, as in daytime, and the time when there is no sunlight, as at night. When there is sunlight, the photovoltaic cell 120 generates effective PV power by performing photovoltaic power generation. When photovoltaic power generation cannot be performed, effective PV power cannot be generated. Since the photovoltaic cell 120 is unable to constantly perform photovoltaic power generation depending on the presence and absence of sunlight, the photovoltaic cell 120 needs to be controlled so as to generate maximum power through maximum power point tracking by which the maximum power point of the power generated by the photovoltaic cell 120 is tracked.

Figure 2:
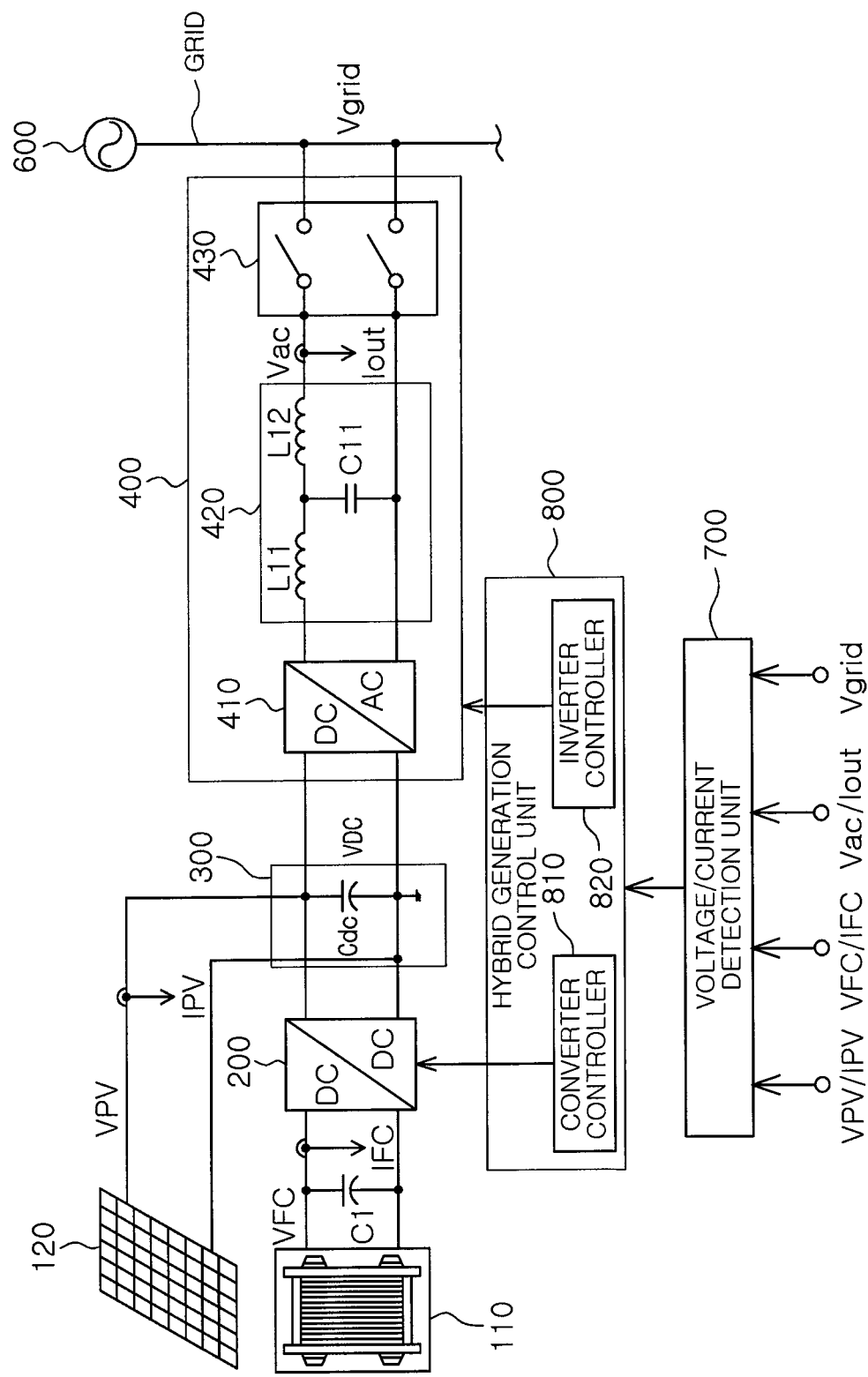
FIG. 2 is a circuit block diagram illustrating a PV-FC hybrid generation system using a single converter and a single inverter, according to another exemplary embodiment of the present invention.

FIG. 2 is a circuit block diagram illustrating a PV-FC hybrid generation system using a single converter and a single inverter according to another exemplary embodiment of the present invention. Referring to FIG. 2, the PV-FC hybrid generation system, according to this embodiment, includes a DC/DC converter unit 200, a DC link unit 300, a DC/AC inverter unit 400, a voltage/current detection unit 700, and a hybrid generation control unit 800. Here, the DC/DC converter unit 200 converts an FC output voltage VFC from a fuel cell 110, which converts chemical energy into electrical energy, into a preset voltage. The DC link unit 300 commonly connects an output terminal of a photovoltaic cell (i.e., solar cell) 120, which converts the sunlight into electrical energy, with an output terminal of the DC/DC converter unit 200, and links the converted FC output voltage VFC from the DC/DC converter unit 200 with a PV output voltage VPV from the photovoltaic cell 20 to thereby generate a DC voltage VDC. The DC/AC inverter unit 400 may convert the DC voltage VDC from the DC link unit 300 into a preset AC voltage Vac. The voltage/current detection unit 700 detects the voltage and current generated by each of the fuel cell 110, the photovoltaic cell 120 and the DC/AC inverter unit 400. The hybrid generation control unit 800 controls the operations of the DC/DC converter unit 200 and the DC/AC inverter unit 400 based on the plurality of voltages and current detected by the voltage/current detection unit 700.

According to the embodiments illustrated in FIGS. 1 and 2, the DC link unit 300 may include a capacitor Cdc connected between the ground and a common connection node NC to which the output terminal of the photovoltaic cell 120 and the output terminal of the DC/DC converter unit 200 are commonly connected.

The DC/AC inverter unit 400 may include a DC/AC inverter 410 converting a DC voltage VDC from the DC link unit 300 into a pulsed voltage, and a filter 420 converting the pulsed voltage from the DC/AC inverter 410 into the AC voltage Vac.

The DC/AC inverter unit 400 may further include a grid transmitter 430 that transmits the AC voltage Vac from the filter 420 to the grid when grid connection is required for power supply to a commercial power supply 600.

The grid transmitter 430 may transmit the AC voltage Vac from the filter 420 to the grid under the control of the hybrid generation control unit 800.

According to the embodiment illustrated in FIG. 2, the voltage/current detection unit 700 may detect the FC output voltage VFC and current IFC of the fuel cell 110, the PV output voltage VPV and current IPV of the photovoltaic cell 120, the AC voltage Vac and output voltage Iout of the DC/AC inverter unit 400, and the grid voltage Vgrid of the grid of the commercial power supply 600.

The hybrid generation control unit 800 may include a converter controller 810 controlling the operation of the DC/DC converter unit 200 by using the grid voltage Vgrid, the FC output voltage VFC and current IFC, and an inverter controller 820 controlling the operation of the DC/AC inverter unit 400 based on the PV output voltage VPV and the current IPV from the voltage/current detection unit 700.

Figure 3:
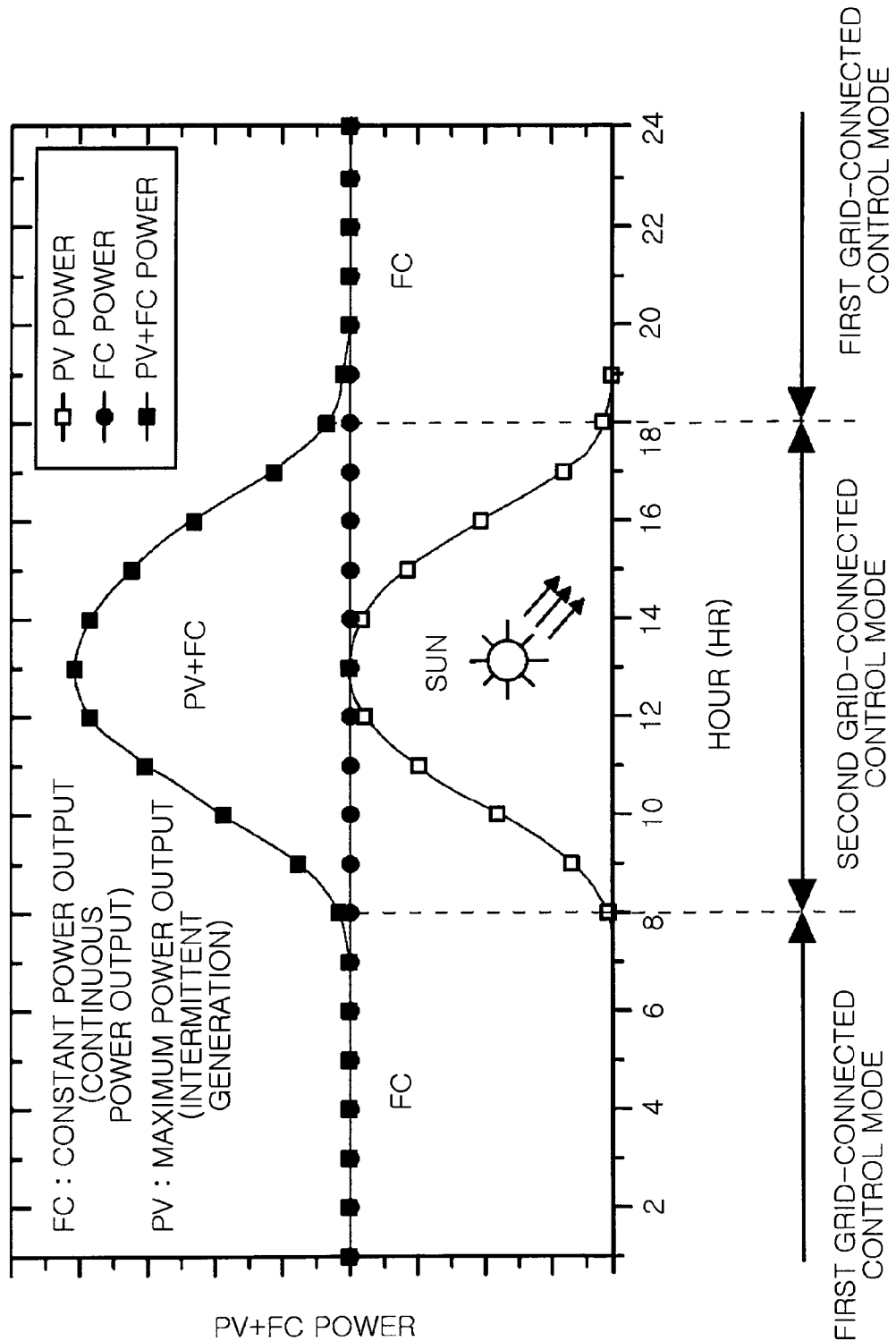
FIG. 3 illustrates output characteristics when the PV-FC hybrid generation system of FIG. 2 is in grid-connected operation, according to an exemplary embodiment of the present invention.

FIG. 3 illustrates output characteristics when the PV-FC hybrid generation system depicted in FIG. 2 is in grid-connected operation, according to an exemplary embodiment of the present invention.

Referring to FIGS. 2 and 3, the hybrid generation control unit 800, in the grid-connected operation, determines a photovoltaic generation status according to PV power PPV based on the PV output voltage VPV and current IPV of the photovoltaic cell 120, and performs one of preset first and second grid-connected control modes according to the determined photovoltaic generation status. The first grid-connected control mode refers to a control mode in which photovoltaic generation is not carried out in a grid-connected operation mode, and the second grid-connected control mode refers to a control mode in which photovoltaic generation is carried out in the grid-connected operation mode.

In more detail, in the grid-connected operation mode, the converter controller 810 and the inverter controller 820 each determine the photovoltaic generation status according to the PV power PPV based on the PV output voltage VPV and current IPV of the photovoltaic cell 120, and perform one of preset first and second grid-connected control modes according to the determined photovoltaic generation status. The first grid-connected control mode refers to a control mode in which photovoltaic generation is not carried out in the grid-connected operation mode, and the second grid-connected control mode refers to a control mode in which photovoltaic generation is carried out in the grid-connected operation mode.

Figure 4:
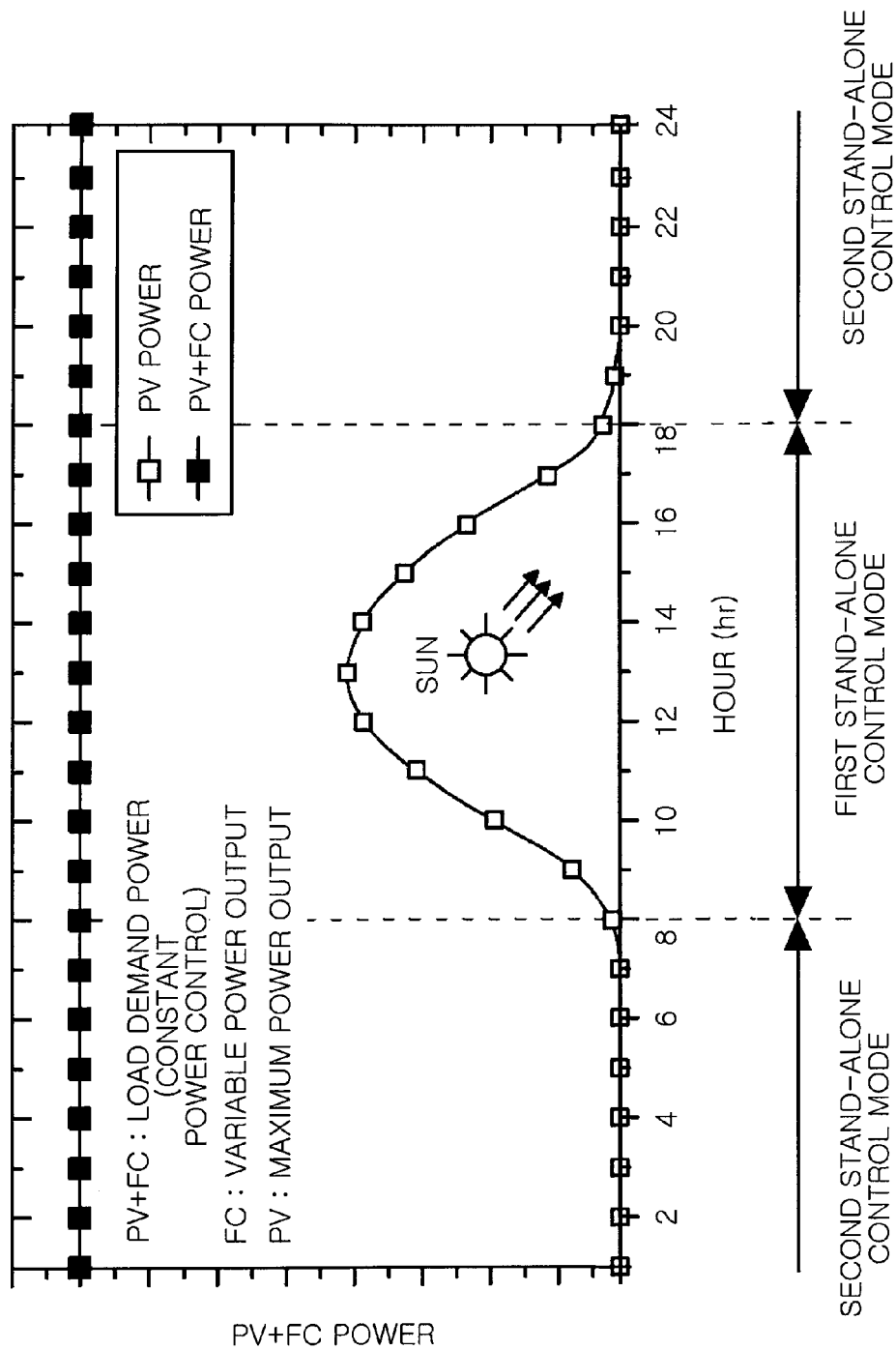
FIG. 4 illustrates output characteristics when the PV-FC hybrid generation system of FIG. 2 is in stand-alone operation, according to an exemplary embodiment of the present invention.

FIG. 4 illustrates output characteristics when the PV-FC hybrid generation system of FIG. 2 is in stand-alone operation, according to an exemplary embodiment of the present invention.

Referring to FIGS. 2, 3 and 4, the hybrid generation control unit 800 determines whether an operation mode is a grid-connected operation mode or a stand-alone operation mode according to the grid voltage Vgrid. In each of the grid-connected and stand-alone operation modes, the hybrid generation control unit 800 determines a photovoltaic generation status according to PV power PPV based on the PV output voltage VPV and current IPV of the photovoltaic cell 120, and performs one of preset first and second grid-connected control modes and first and second stand-alone control modes. Here, the first grid-connected control mode is a control mode in which photovoltaic generation is not carried out in the grid-connected operation mode, and the second grid-connected control mode is a control mode in which photovoltaic generation is carried out in the grid-connected operation mode. The first stand-alone control mode is a control mode in which photovoltaic generation is carried in the stand-alone operation without a grid connection, and the second stand-alone control mode is a control mode in which photovoltaic generation is carried out in the stand-alone operation without a grid connection.

In more detail, each of the converter controller 810 and the inverter controller 820 determines, according to the grid voltage Vgrid, whether a grid connection is made, determines a photovoltaic generation status according to PV power PPV based on the PV output voltage VPV and current IPV of the photovoltaic cell 120, and performs one of the preset first and second grid-connected control modes and first and second stand-alone control modes according to whether or not the grid connection is made and whether or not the photovoltaic generation is carried out. Here, the first grid-connected control mode is a control mode in which photovoltaic generation is not carried out in the grid-connected operation mode, and the second grid-connected control mode is a control mode in which photovoltaic generation is carried out in the grid-connected operation mode. The first stand-alone control mode is a control mode in which photovoltaic generation is carried out in the stand-alone operation without a grid connection, and the second stand-alone control mode is a control mode in which photovoltaic generation is carried out in the stand-alone operation without a grid connection.

Figure 5:
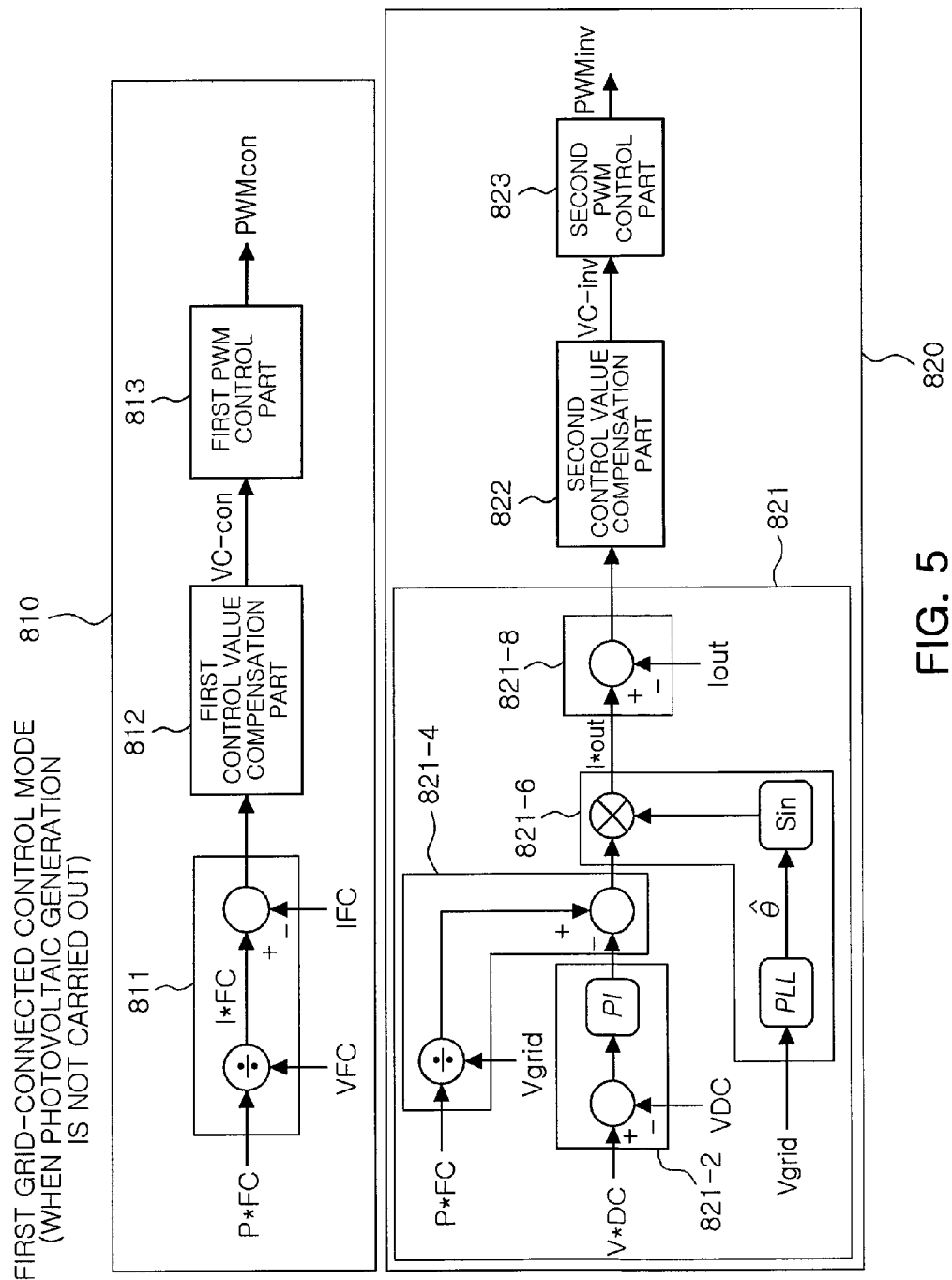
FIG. 5 is a conceptual view of a first grid-connected control mode in which photovoltaic generation is not carried out during the grid-connected operation of the PV-FC hybrid generation system of FIG. 2, according to an exemplary embodiment of the present invention.

FIG. 5 is a conceptual view of the first grid-connected control mode in which photovoltaic generation is not carried out during the grid-connected operation of the PV-FC hybrid generation system depicted in FIG. 2, according to an exemplary embodiment of the present invention.

Referring to FIG. 5, the converter controller 810 may include a first calculation part 811, a first control value compensation part 812, and a first PWM control part 813. The first calculation part 811 calculates a first control error value for constant power control of the DC/DC converter unit 200 in the first grid connection control mode. The first control value compensation part 812 compensates a converter control value VC-con by using the first control error value from the first calculation part 811. The first PWM control part 813 generates a PWM converter control signal PWM-con by using the compensated converter control value VC-con from the first control value compensation part 812, and controls the operation of the DC/DC converter unit 200 by using the PWM converter control signal PWM-con.

The first calculation part 811 of the converter controller 810 may be configured to generate an FC current command value I*FC by dividing a preset FC power command value P*FC by, the FC output voltage VFC in the first grid-connected control mode, and to calculate the first control error value corresponding to a difference value between the FC current command value I*FC and the FC current IFC.

Referring to FIG. 5, the inverter controller 820 may include a second calculation part 821, a second control value compensation part 822 and a second PWM control part 823. The second calculation part 821 calculates a second control error value for DC link, grid connection and output current control with respect to the DC/AC inverter unit 400 in the first grid-connected control mode. The second control value compensation part 822 compensates an inverter control value VC-inv by using the second control error value from the second calculation part 821. The second PWM control part 823 generates a PWM inverter control signal PWM-inv by using the compensated inverter control value VC-inv from the second control value compensation part 822, and controls the operation of the DC/AC inverter unit 400 by using the PWM inverter control signal PWM-inv.

The second calculation part 821 of the inverter controller 820 may include a DC link calculation portion 821-2, an error correction portion 821-4, a DC/AC conversion portion 821-6, and an error calculation portion 821-8. The DC link calculation portion 821-2 calculates a current error value corresponding to a difference value between a preset DC voltage command value V*DC and the DC voltage VDC in the first grid-connected control mode, and compensates a current command value by using the current error value. The error correction portion 821-4 calculates a current correction value Iout_ff by dividing a preset FC power command value P*FC by the grid voltage Vgrid, and corrects the compensated current command value from the DC link calculation portion 821-2 by using the current correction value Iout_ff. The DC/AC conversion portion 821-6 detects the phase of the grid voltage Vgrid, and converts the current command value of the error correction portion 821-4 into an AC output current command value I*out by synchronizing the current command value with the detected phase. The error calculation portion 821-8 generates the second control error value corresponding to a difference value between the output current Iout and the output current command value I*out from the DC/AC conversion portion 821-6.

Figure 6:
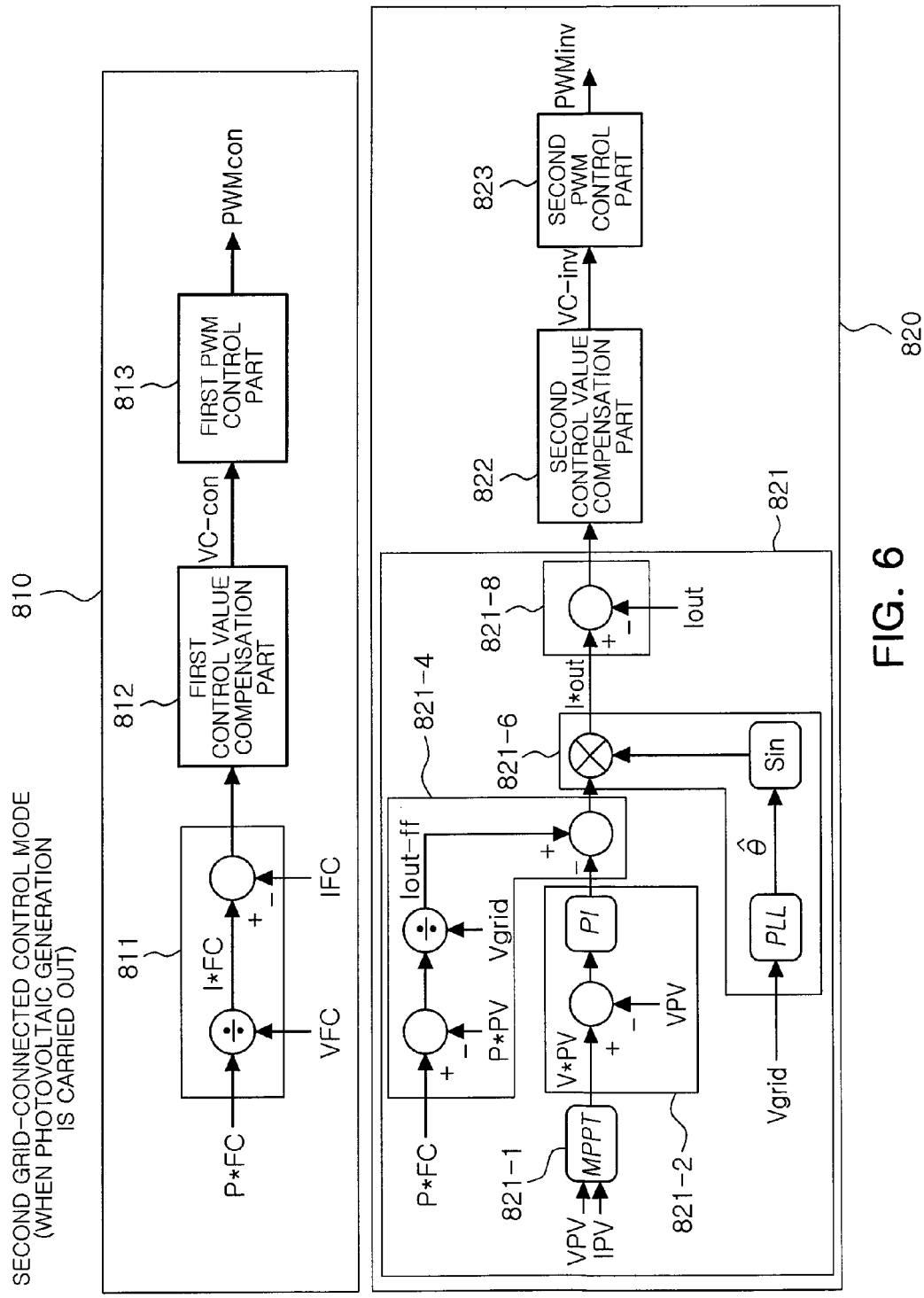
FIG. 6 is a conceptual view of a second grid-connected control mode in which photovoltaic generation is carried out during the grid-connected operation of a PV-FC hybrid generation system of FIG. 2, according to an exemplary embodiment of the present invention.

FIG. 6 is a conceptual view of the second grid-connected control mode in which photovoltaic generation is carried out during the grid-connected operation of the PV-FC hybrid generation system depicted in FIG. 2, according to an exemplary embodiment of the present invention.

Referring to FIG. 6, the converter controller 810 may include the first calculation part 811, the first control value compensation part 812, and the first PWM control part 813.

The first calculation part 811 calculates a first control error value for constant power control of the DC/DC converter unit 200 in the second grid connection control mode. The first control value compensation part 812 compensates a converter control value VC-con by using the first control error value from the first calculation part 811. The first PWM control part 813 generates a PWM converter control signal PWM-con by using the compensated converter control value VC-con from the first control value compensation part 812, and controls the operation of the DC/DC converter unit 200 by using the PWM converter control signal PWM-con.

The first calculation part 811 of the converter controller 810 may be configured to generate an FC current command value I*FC by dividing a preset FC power command value P*FC by the FC output voltage VFC in the second grid-connected control mode, and calculate the first control error value corresponding to a difference value between the FC current command value I*FC and the FC current IFC.

Referring to FIG. 6, the inverter controller 820 may include the second calculation part 821, the second control value compensation part 822, and the second PWM control part 823. In the second grid-connected control mode, the second calculation part 821 calculates a second control error value for the maximum power point tracking (MPPT), DC link, grid connection and output current control with respect to the DC/AC inverter unit 400. The second control value compensation part 822 compensates an inverter control value VC-inv by using the second control error value from the second calculation part 821. The second PWM control part 823 generates a PWM inverter control signal PWM-inv by using the compensated inverter control value VC-inv from the second control value compensation part 822, and controls the operation of the DC/AC inverter unit 400 by using the PWM inverter control signal PWM-inv.

The second calculation part 821 of the inverter controller 820 includes a maximum power point tracking portion (hereinafter, 'MPPT portion') 821-1 and the DC link calculation portion 821-2. The MPPT portion 821-1, in the second grid-connected control mode, generates a PV output voltage command value V*PV by performing preset MPPT by using the PV output voltage VPV and current IPV. The DC link calculation portion 821-2 calculates a voltage error value corresponding to a difference value between the PV output voltage VPV and the PV output voltage command value (V*PV), and compensates an output current command value by using the voltage error value.

Furthermore, the second calculation part 821 of the inverter controller 820 includes the error correction portion 821-4, the DC/AC conversion portion 821-6, and the error calculation portion 821-8. The error correction portion 821-4 calculates a power command value by adding a preset FC power command value P*FC and a preset PV power command value P*PV, calculates a current correction value Iout_ff by dividing the power command value by the grid voltage Vgrid, and corrects the compensated output current command value of the DC link calculation portion 821-2 using the current correction value Iout_ff. The DC/AC conversion portion 821-6 detects the phase of the grid voltage Vgrid, and converts the current command value into an AC output current command value I*out by synchronizing the current command value with the detected phase. The error calculation portion 821-8 generates a second control error value corresponding to a difference value between the output current command value I*out from the DC/AC conversion portion 821-6 and the output current Iout.

Figure 7:
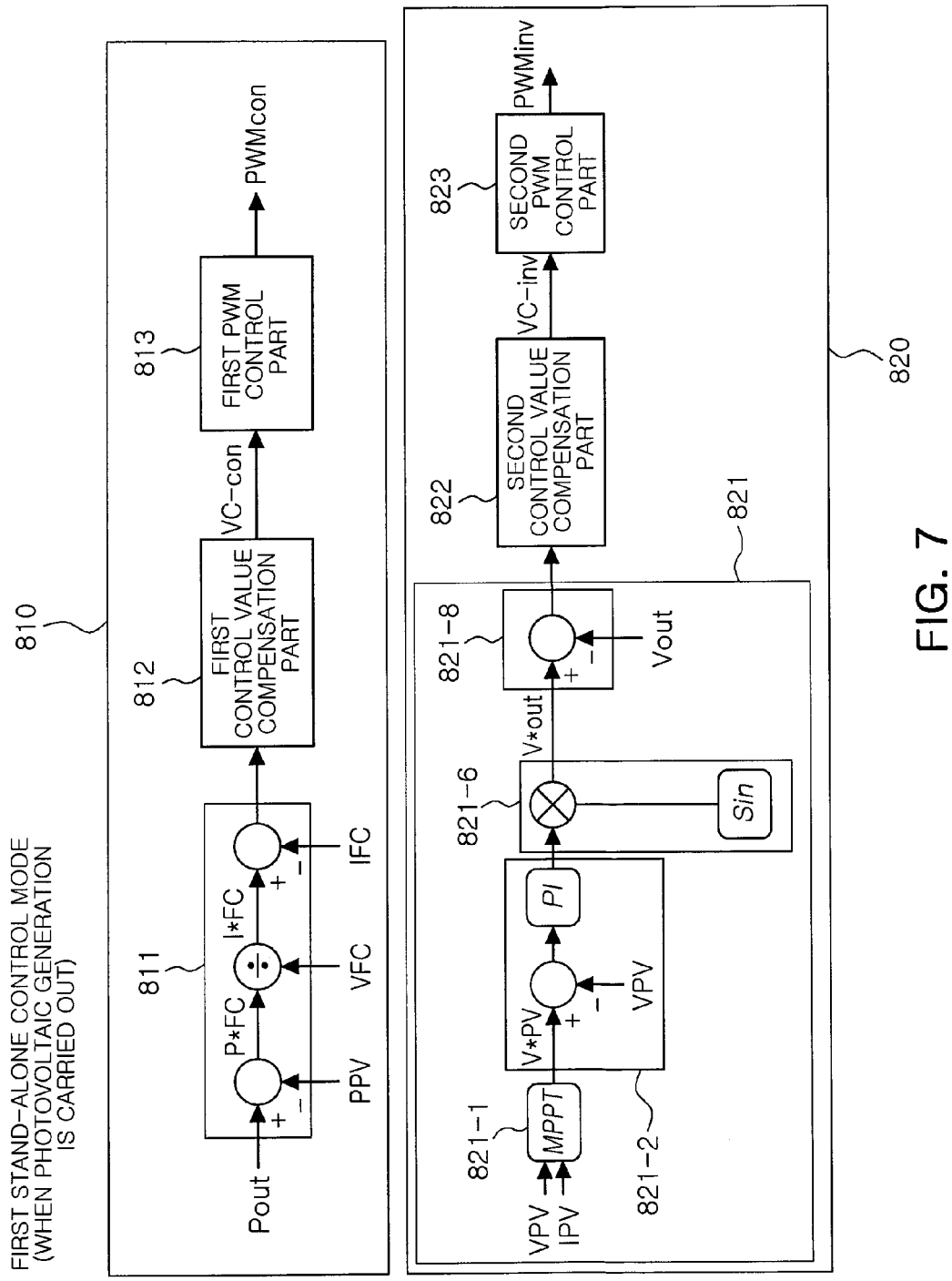
FIG. 7 is a conceptual view of a first stand-alone control mode in which photovoltaic generation is carried out during the stand-alone operation of the PV-FC hybrid generation system of FIG. 2, according to an exemplary embodiment of the present invention.

FIG. 7 is a conceptual view of the first stand-alone control mode in which photovoltaic generation is carried out during the stand-alone operation of the PV-FC hybrid generation system depicted in FIG. 2, according to an exemplary embodiment of the present invention.

Referring to FIG. 7, the converter controller 810 may include the first calculation part 811, the first control value compensation part 812, and the first PWM control part 813. The first calculation part 811, in the first stand-alone control mode, calculates a first control error value for current control of the DC/DC converter unit 200. The first control value compensation part 812 compensates a converter control value VC-con by using the first control error value from the first calculation part 811. The first PWM control part 813 generates a PWM converter control signal PWM-con by using the compensated converter control value VC-con from the first control value compensation part 812, and controls the operation of the DC/DC converter unit 200 by using the PWM converter control signal.

In each of the first grid-connected control mode, the second grid-connected control mode and the first stand-alone control mode, the first calculation part 811 of the converter controller 810 may generate an FC current command value I*FC by dividing a preset FC power command value P*FC by the FC output voltage VFC, and calculate the first control error value corresponding to a difference value between the FC current command value I*FC and the FC current IFC.

Here, the output power Pout may be calculated by using the AC voltage Vac and output current Iout of the DC/AC inverter unit 400, the PV power PPV may be calculated by using the PV output voltage VPV and current IPV of the photovoltaic cell 120, and the FC power command value P*FC may correspond to a difference value between the output power Pout and the PV power PPV.

Referring to FIG. 7, the inverter controller 820 may include the second calculation part 821, the second control value compensation part 822, and the second PWM control part 823. The second calculation part 821, in the first stand-alone control mode, calculates a second control error value for the MPPT, DC link and output constant-voltage control with respect to the DC/AC inverter unit 400. The second control value compensation part 822 compensates an inverter control value VC-inv by using the second control error value from the second calculation part 821. The second PWM control part 823 generates a PWM inverter control signal PWM-inv by using the compensated inverter control value VC-inv from the second control value compensation part 822, and controls the operation of the DC/AC inverter unit 400 by using the PWM inverter control signal PWM-inv.

The second calculation part 821 of the inverter controller 820 may include the MPPT portion 821-1, the DC link calculation portion 821-2, the DC/AC conversion portion 821-6, and the error calculation portion 821-8. The MPPT portion 821-1, in the first stand-alone control mode, generates a PV output voltage command value V*PV by performing preset MPPT by using the PV output voltage VPV and current IPV. The DC link calculation portion 821-2 calculates a voltage error value corresponding to a difference value between the PV output voltage VPV and the PV output voltage command value V*PV, and compensates an output voltage command value V*out by using the voltage error value. The DC/AC conversion portion 821-6 converts the output voltage command value from the DC link calculation portion 821-2 into an AC output voltage command value V*out. The error calculation portion 821-8 generates the second control error value corresponding to a difference value between the output voltage command value V*out from the DC/AC conversion portion 821-6 and the output voltage Vout.

Figure 8:
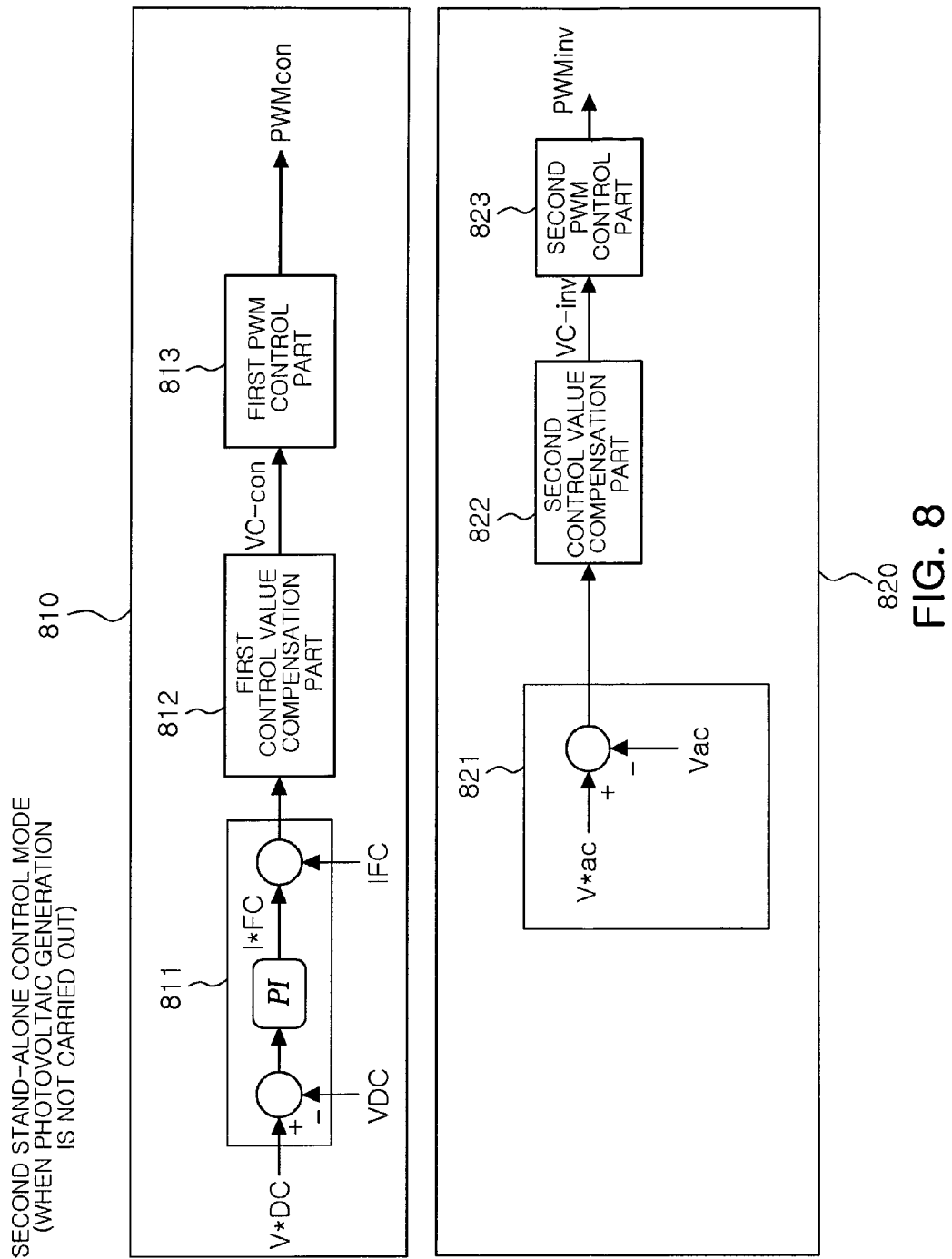
FIG. 8 is a conceptual view of a second stand-alone control mode in which photovoltaic generation is not carried out during the stand-alone operation of the PV-FC hybrid generation system of FIG. 2, according to an exemplary embodiment of the present invention.

FIG. 8 is a conceptual view of the second stand-alone control mode in which photovoltaic generation is not carried out during the stand-alone operation of the PV-FC hybrid generation system depicted in FIG. 2, according to an exemplary embodiment of the present invention.

Referring to FIG. 8, the converter controller 810 may include the first calculation part 811, the first control value compensation part 812, and the first PWM control part 813. In the second stand-alone control mode, the first calculation part 811 calculates a first control error value for DC link control of the DC/DC converter unit 200. The first control value compensation part 812 compensates a converter control value VC-con by using the first control error value from the first calculation part 811. The first PWM control part 813 generates a PWM converter control signal PWM-con by using the compensated converter control value VC-con from the first control value compensation part 812, and controls the operation of the DC/DC converter unit 200 by using the PWM converter control signal.

Here, the first calculation part 811 of the converter controller 810, in the second stand-alone control mode, may be configured to calculate a voltage error value corresponding to a difference value between a preset DC voltage command value V*DC and the DC voltage VDC, to compensate a preset FC current command value I*FC by using this voltage error value, and to calculate the first control error value corresponding to a difference value between the compensated FC current command value I*FC and the FC current IFC.

Referring to FIG. 8, the inverter controller 820 may include the second calculation part 821, the second control value compensation part 822, and the second PWM control part 823. In the second stand-alone control mode, the second calculation part 821 calculates a second control error value for output constant-voltage control of the DC/AC inverter unit 400. The second control value compensation part 822 compensates an inverter control value VC-inv by using the second control error value from the second calculation part 821. The second PWM control part 823 generates a PWM inverter control signal PWM-inv by using the compensated inverter control value VC-inv from the second control value compensation part 822, and controls the operation of the DC/AC inverter unit 400 by using the PWM inverter control signal PWM-inv.

Here, in the second stand-alone control mode, the second calculation part 821 of the inverter controller 820 may be configured to generate the second control error value corresponding to a difference value between the AC voltage command value V*ac and the AC voltage Vac.

Figure 9:
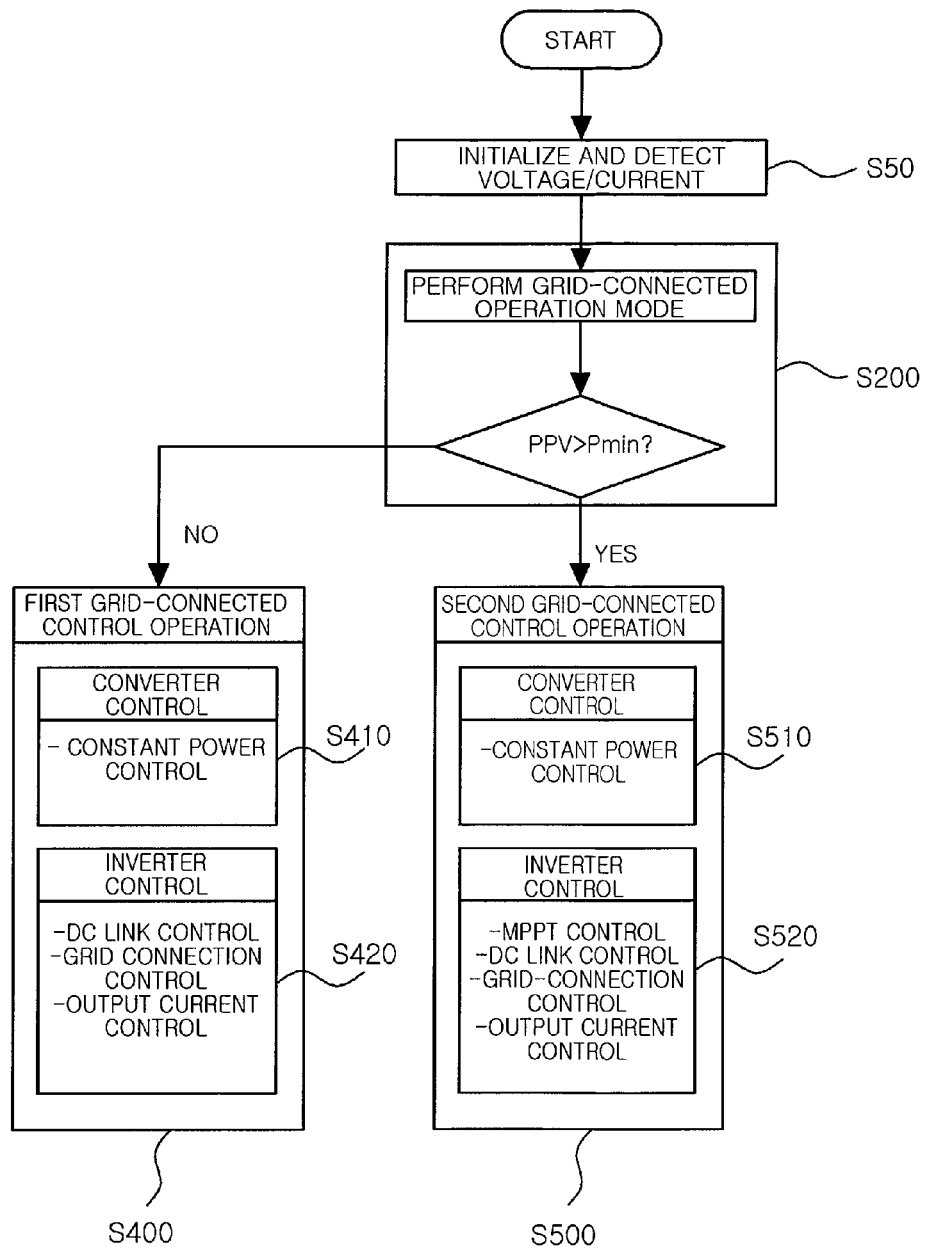
FIG. 9 is a flowchart illustrating a PV-FC hybrid generation method using a single converter and a single inverter, according to an exemplary embodiment of the present invention.

FIG. 9 is a flowchart illustrating a PV-FC hybrid generation method using a single converter and a single inverter according to an exemplary embodiment of the present invention.

Referring to FIGS. 2, 3 and 9, a method of controlling a PV-FC hybrid generation system according to this embodiment is applicable to the PV-FC hybrid generation system that includes the DC/DC converter unit 200 converting an FC output voltage VFC from the fuel cell 110 into a preset voltage, the DC link unit 300 generating a DC voltage VDC by linking the converted FC output voltage VFC from the DC/DC converter unit 200 with a PV output voltage VPV from the photovoltaic cell 120, and the DC/AC inverter unit 400 converting the DC voltage VDC from the DC link unit 300, into a preset AC voltage Vac.

The method of controlling the PV-FC hybrid generation system, according to this embodiment, includes: detecting voltage and current required to determine whether or not the grid connection is made and photovoltaic generation is carried out in operation S50 (hereinafter also "system start operation"); performing a grid-connected operation mode when the grid connection is available and determining a photovoltaic generation status by comparing preset minimum PV power Pmin with PV power PPV calculated based on the PV output voltage VPV and output current IPV of the photovoltaic cell 120 in operation 5200 (hereinafter also "grid-connected photovoltaic-generation determining operation"); and performing a first grid connected operation mode when it is determined in operation 5200 that photovoltaic generation is not carried out in operation 5400 (hereinafter also "first grid-connected control operation"). Here, the first grid connected operation mode of the first grid-connected control operation S400 includes: controlling constant power with respect to the DC/DC converter unit 200 in operation 5410 (hereinafter also "converter control operation); and controlling the DC link, grid connection and output current with respect to the DC/AC inverter unit 400 in operation S420 (hereinafter also "inverter control operation").

The method of controlling the PV-FC hybrid generation system according to this embodiment may further include performing a second grid-connected operation mode when it is determined in operation 5200 that photovoltaic generation is carried out in the grid-connected operation mode in operation S500 (hereinafter also "second grid-connected control operation"). Here, the second grid-connected operation mode of the second grid-connected control operation S500 includes: controlling constant power with respect to the DC/DC converter unit 200 in operation S510 (hereinafter also "converter control operation"); and controlling MPPT, DC link, grid connection and output current with respect to the DC/AC inverter unit 400 in operation S520 (hereafter also referred to as "inverter control operation).

Figure 10:
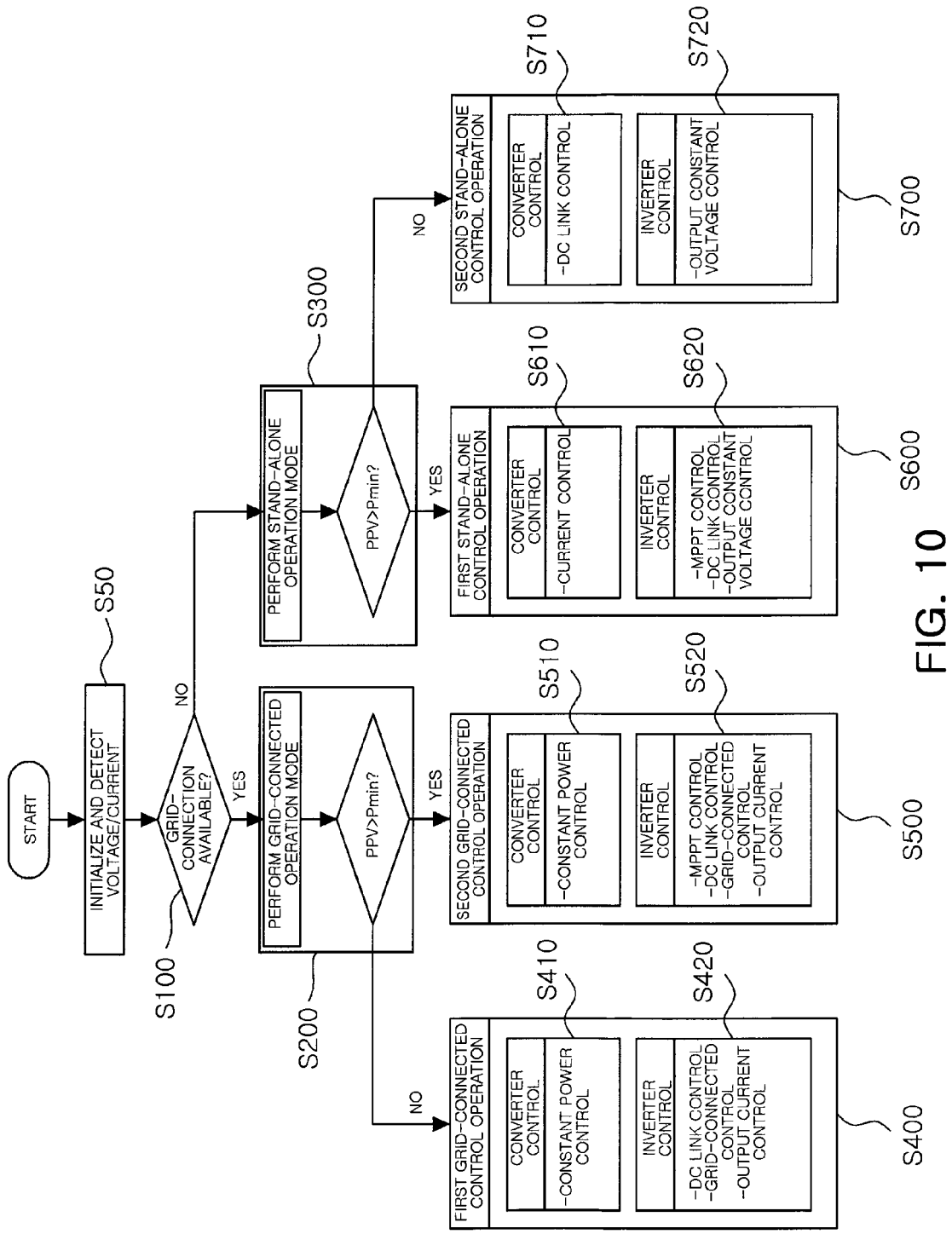
FIG. 10 is a flowchart illustrating a PV-FC hybrid generation method using a single converter and a single inverter according to another exemplary embodiment of the present invention.

FIG. 10 is a flowchart illustrating a PV-FC hybrid generation method using a single converter and a single inverter according to another exemplary embodiment of the present invention.

Referring to FIGS. 2, 3, 4 and 10, a method of controlling a PV-FC hybrid generation system according to this embodiment is applicable to the PV-FC hybrid generation system that includes the DC/DC converter unit 200 converting an FC output voltage VFC from the fuel cell 110 into a preset voltage, the DC link unit 300 generating a DC voltage VDC by linking the converted FC output voltage VFC from the DC/DC converter unit 200 with a PV output voltage VPV from the photovoltaic cell 120, and the DC/AC inverter unit 400 converting the DC voltage VDC from the DC link unit 300, into a preset AC voltage Vac.

The method of controlling a PV-FC hybrid generation system, according to this embodiment depicted in FIG. 10, includes: detecting voltage and current required to determine whether or not the grid connection is made and photovoltaic generation is carried out in operation S50 (hereinafter also "system start operation"); determining whether the operation mode is a grid-connected operation mode or a stand-alone operation mode according to the grid voltage Vgrid in operation S100 (hereinafter also "operation mode determining operation); determining a photovoltaic generation status by comparing preset minimum PV power Pmin with PV power PPV calculated based on the PV output voltage VPV and output current IPV of the photovoltaic cell 120 when the grid-connected operation mode is performed, in operation S200 (hereinafter also "grid-connected photovoltaic-generation determining operation"); determining a photovoltaic generation status by comparing preset minimum PV power Pmin with the PV power PPV of the photovoltaic cell 120 when the stand-alone operation mode is performed, in operation S300 (hereinafter also "stand-alone photovoltaic generation determining operation"); and performing a first grid connected operation mode when it is determined in operation S200 that photovoltaic generation is not carried out in the grid-connected operation mode, in operation S400 (hereinafter also "first grid-connected control operation"). Here, the first grid-connected operation mode of the first grid-connected control operation S400 includes: controlling constant power with respect to the DC/DC converter unit 200 in operation S410 (hereafter also referred to as "converter control operation"); and controlling the DC link, grid connection and output current with respect to the DC/AC inverter unit 400 in operation S420 (hereinafter also "inverter control operation").

The method of controlling the PV-FC hybrid generation system according to this embodiment may further include performing a second grid-connected operation mode when it is determined in operation S200 that photovoltaic generation is carried out in the grid-connected operation mode, in operation S500 (hereinafter also "second grid-connected control operation). Here, the second grid-connected operation mode of the second grid-connected control operation S500 includes: controlling constant power with respect to the DC/DC converter unit 200 when it is determined in operation S200 that photovoltaic generation is carried out in the grid-connected operation mode in operation S510 (hereinafter also "converter control operation"); and controlling MPPT, DC link, grid connection and output current with respect to the DC/AC inverter unit 400 in operation S520 (hereafter also "inverter control operation).

The method of controlling the PV-FC hybrid generation system according to this embodiment may further include: performing a first stand-alone operation mode when it is determined in operation S300 that photovoltaic generation is carried out in the stand-alone operation mode, in operation S600 (hereinafter also "first stand-alone control operation); and performing a second stand-alone operation mode when it is determined in operation S300 that photovoltaic generation is not carried out in the stand-alone operation mode, in operation S700 (hereinafter also "second stand-alone control mode). Here, the first stand-alone operation mode of the first stand-alone control operation 5600 includes controlling current with respect to the DC/DC converter unit 200 in operation 5610 (hereinafter also "converter control operation"), and controlling MPPT, DC link and output constant voltage with respect to the DC/AC inverter unit 400 in operation 5620 (hereinafter also "inverter control operation"). The second stand-alone operation mode of the second stand-alone control operation 5700 includes controlling DC link with respect to the DC/DC converter unit 200 in operation 5710 (hereinafter also "converter control operation"), and controlling output constant voltage with respect to the DC/AC inverter unit 400 in operation S720 (hereinafter also "inverter control operation").

The system start operation S50, the operation mode determining operation S100, the grid-connected photovoltaic generation determining operation S200, the stand-alone photovoltaic generation determining operation S300, the first grid-connected control operation 5400, and the second grid-connected control operation S500 may each be performed in such a way that the FC output voltage VFC and current IFC of the fuel cell 100, the PV output voltage VPV and current IPV of the photovoltaic cell 120, the AC voltage Vac and output current Iout from the DC/AC inverter unit 400, and the grid voltage Vgrid from the grid of the commercial power supply 600 are detected.

Figure 11:
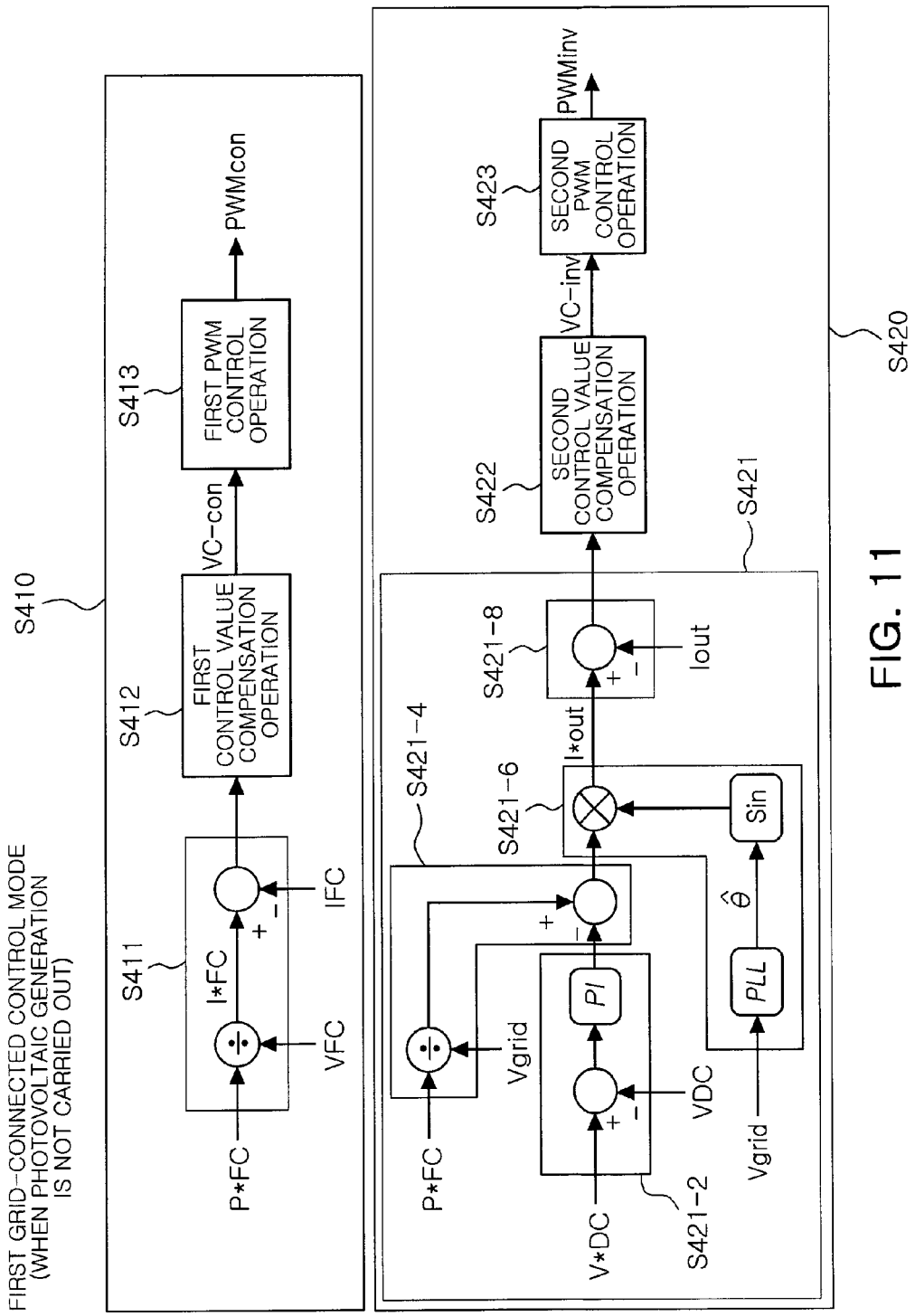
FIG. 11 is a view illustrating the flow of a first grid-connected control mode in which photovoltaic generation is not carried out during the grid-connected operation of the PV-FC hybrid generation system, according to an exemplary embodiment of the present invention.

FIG. 11 is a view illustrating the flow of the first grid-connected control mode in which photovoltaic generation is not carried out during the grid-connected operation of the PV-FC hybrid generation system, according to an exemplary embodiment of to the present invention.

Referring to FIGS. 9, 10 and 11, the converter control operation S410 of the first grid-connected control operation S400 may include: calculating a first control error value for constant power control with respect of the DC/DC converter unit 200 in operation S411 (hereinafter also "first calculation operation"); compensating a converter control value VC-con by using the first control error value from the first calculation operation S411, in operation S412 (hereinafter also "first control value compensation operation"); and generating a PWM converter control signal PWM-con by using the converted control value VC-con compensated in the first control value compensation operation S412, and controlling the operation of the DC/DC converter unit 200 by using the PWM converter control signal in operation 5413 (hereinafter also "first PWM control operation").

The first calculation operation S411 of the first grid-connected control operation S400 may be conducted such that an FC current command value I*FC is generated by dividing a preset FC power command value P*FC by the FC output voltage VFC, and the first control error value corresponding to a difference value between the FC current command value I*FC and the FC current IFC is calculated.

Referring to FIGS. 9, 10 and 11, the inverter control operation S420 of the first grid-connected control operation S400 may include: calculating a second control error value for DC link, grid connection and output current control with respect to the DC/AC inverter unit 400 in operation S421 (hereinafter also "second calculation operation"); compensating an inverter control value VC-inv by using the second control error value from the second calculation operation S421, in operation S422 (hereinafter also "second control value compensation operation"); and generating a PWM inverter control signal PWM-inv by using the inverter control value VC-inv compensated in the second control value compensation operation 5422, and controlling the operation of the DC/AC inverter unit 400 by using the PWM inverter control signal PWM-inv in operation S423 (hereinafter also "second PWM control operation").

The second calculation operation S421 of the first grid-connected control operation S400 may include: calculating a current error value corresponding to a difference value between a preset DC voltage command value V*DC and the DC voltage VDC, and compensating a current command value by using the current error value in operation S421-2 (hereinafter also "DC link calculation operation"); calculating a current correction value Iout_ff by dividing a preset FC power command value P*FC by the grid voltage Vgrid, and correcting the current command value compensated in the DC link calculation operation S421-2, by using the current correction value Iout-ff in operation S421-4 (hereinafter also "error correction operation"); detecting the phase of the grid voltage Vgrid, and converting the current command value from the error correction operation S421-4, into an AC output current command value I*out by synchronizing the current command value with the detected phase in operation S421-6 (hereinafter also "DC/AC conversion operation"); and generating the second control error value corresponding to a difference value between the output current Iout and the output current command value I*out from the DC/AC conversion operation S421-6, in operation S421-8 (hereinafter also "error calculation operation").

Figure 12:
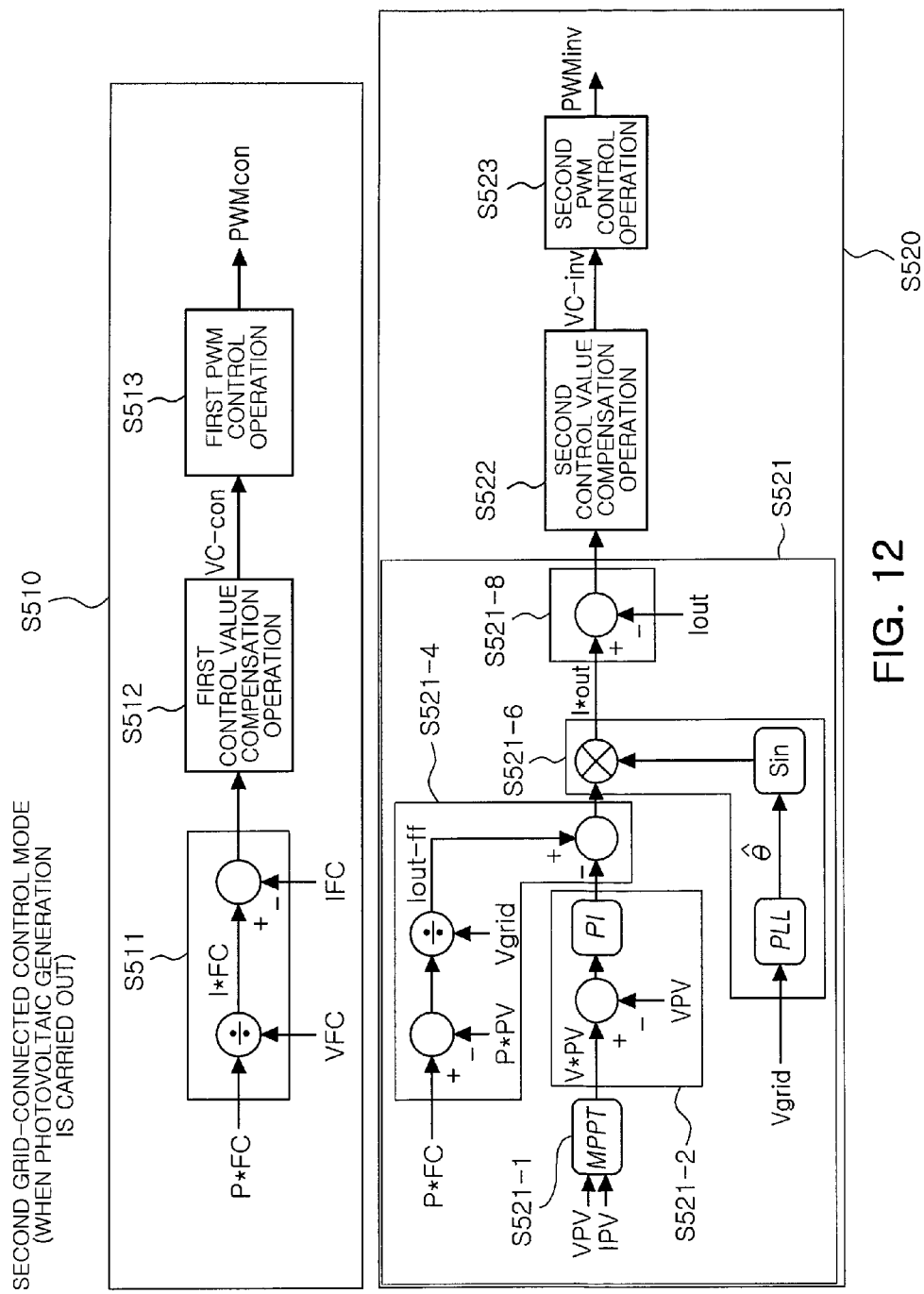
FIG. 12 is a view illustrating the flow of a second grid-connected control mode in which photovoltaic generation is carried out during the grid-connected operation of the PV-FC hybrid generation system, according to an exemplary embodiment of the present invention.

FIG. 12 is a view illustrating the flow of the second grid-connected control mode in which photovoltaic generation is carried out during the grid-connected operation of the PV-FC hybrid generation system, according to an exemplary embodiment of the present invention.

Referring to FIGS. 9, 10 and 12, the converter control operation S510 of the second grid-connected control operation S500 may include: calculating a first control error value for constant power control with respect to the DC/DC converter unit 200 in operation S511 (hereinafter also "first calculation operation"); compensating a converter control value VC-con by using the first control error value obtained in the first calculation operation S511, in operation S512 (hereinafter also "first control value compensation operation"); generating a PWM converter control signal PWM-con by using the converter control value VC-con compensated in the first control value compensation operation 5512, and controlling the operation of the DC/DC converter unit 200 by using the PWM converter control signal PWM-con in operation S513 (hereinafter also "first PWM control operation").

The first calculation operation S511 of the second grid-connected control operation S500 may be performed such that an FC current command value I*FC is generated by dividing a preset FC power command value P*FC by the FC output voltage VFC, and the first control error value corresponding to a difference value between the FC current command value I*FC and the FC current IFC is calculated.

Referring to FIGS. 9, 10 and 12, the inverter control operation 5520 of the second grid-connected control operation S500 may include: calculating a second control error value for the MPPT, DC link and output constant-voltage control with respect to the DC/AC inverter unit 400 in operation S521 (hereinafter also "second calculation operation"); compensating an inverter control value VC-inv by using the second control error value obtained in the second calculation operation S521, in operation S522 (hereinafter also "second control value compensation operation"); and generating a PWM inverter control signal PWM-inv by using the inverter control value VC-inv compensated in the second control value compensation operation S522, and controlling the operation of the DC/AC inverter unit 400 by using the PWM inverter control signal PWM-inv in operation 5523 (hereinafter also "second PWM control operation").

The second calculation operation 521 of the second grid-connected control operation S500 may include: generating a PV output voltage command value V*PV by performing preset MPPT by using the PV output voltage VPV and current IPV in operation S521-1 (hereinafter "MPPP operation"); calculating a voltage error value corresponding to a difference value between the PV output voltage VPV and the PV output voltage command value V*PV, and compensating an output current command value V*out by using the voltage error value in operation S521-2 (hereinafter also "DC link calculation operation); calculating a power command value by adding a preset FC power command value P*FC and a preset PV power command value P*PV, calculating a current correction value Iout_ff by dividing the power command value by the grid voltage Vgrid, and correcting the output current command value compensated in the DC link calculation operation S521-2 by using the current correction value Iout_ff, in operation S521-4 (hereinafter also "error correction operation"); detecting the phase of the grid voltage Vgrid, and converting the current command value into an AC output current command value I*out by synchronizing the current command value with the detected phase in operation S521-6 (hereinafter also "DC/AC conversion operation"); and generating a second control error value corresponding to a difference value between the output current Iout and the output current command value I*out from the DC/AC conversion operation S521-6, in operation S521-8 (hereinafter also "error calculation operation").

Figure 13:
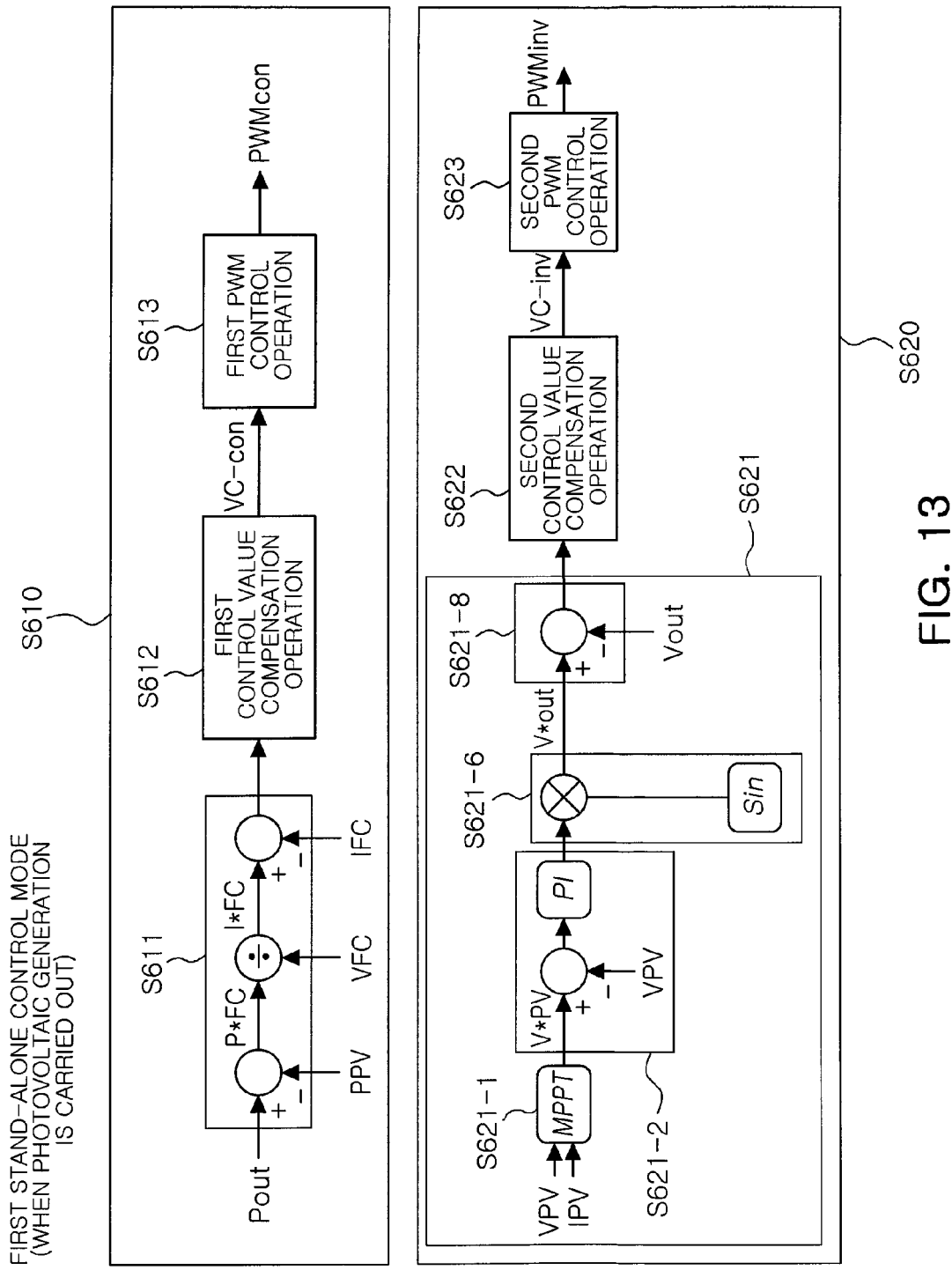
FIG. 13 is a view illustrating the flow of a first stand-alone control mode in which photovoltaic generation is carried out during the stand-alone operation of the PV-FC hybrid generation system, according to an exemplary embodiment of the present invention.

FIG. 13 is a view illustrating the flow of the first stand-alone control mode in which photovoltaic generation is carried out during the stand-alone operation of the PV-FC hybrid generation system, according to an exemplary embodiment of the present invention.

Referring to FIGS. 10 and 13, the converter control operation S610 of the first stand-alone control operation S600 may include: calculating a first control error value for current control with respect to the DC/DC converter unit 200 in operation S611 (hereinafter also "first calculation operation"); compensating a converter control value VC-con by using the first control error value obtained in the first calculation operation S611, in operation S612 (hereinafter "first control value compensation operation"); and generating a PWM converter control signal PWM-con by using the converter control value VC-con compensated in the first control value compensation operation S612, and controlling the operation of the DC/DC converter unit 200 by using the PWM converter control signal PWM-con in operation S613 (hereinafter also "first PWM control operation").

The first calculation operation S611 of the first stand-alone control operation S600 may be performed such that an FC current command value I*FC is generated by dividing a preset FC power command value P*FC by the FC output voltage VFC, and the first control error value corresponding to a difference value between the FC current command value I*FC and the FC current IFC is calculated.

Here, the output power Pout may be calculated by using the AC voltage Vac and output current Iout of the DC/AC inverter unit 400, the PV power PPV may be calculated by using the PV output voltage VPV and current IPV of the photovoltaic cell 120, and the FC power command value P*FC may correspond to a difference value between the output power Pout and the PV power PPV.

Referring to FIGS. 10 and 13, the inverter control operation S620 of the first stand-alone control operation S600 may include: calculating a second control error value for the MPPT, DC link and output constant-voltage control with respect to the DC/AC inverter unit 400 in operation S621 (hereinafter also "second calculation operation"); compensating an inverter control value VC-inv by using the second control error value from the second calculation operation S621, in operation S622 (hereinafter also "second control value compensation operation"); and generating a PWM inverter control signal PWM-inv by using the inverter control value VC-inv compensated in the second control value compensation operation S622, and controlling the operation of the DC/AC inverter unit 400 by using the PWM inverter control signal PWM-inv in operation S623 (hereinafter also "second PWM control operation").

Referring to FIGS. 10 and 13, the second calculation operation S621 of the first stand-alone control operation S600 may include: generating a PV output voltage command value V*PV by performing preset MPPT by using the PV output voltage VPV and current IPV in operation S621-1 (hereinafter also "MPPT operation"); calculating a voltage error value corresponding to a difference value between the PV output voltage VPV and the PV output voltage command value V*PV, and compensating an output voltage command value V*out by using the voltage error value in operation S621-2 (hereinafter "DC link calculation operation"); converting the output voltage command value obtained in the DC link calculation operation S621-2, into an AC output voltage command value V*out in operation S621-6 (hereinafter also "DC/AC conversion operation"); and generating the second control error value corresponding to a difference value between the output voltage command value V*out from the DC/AC conversion operation S621-6, and the output voltage Vout in operation S621-8 (hereinafter also "error calculation operation").

Figure 14:
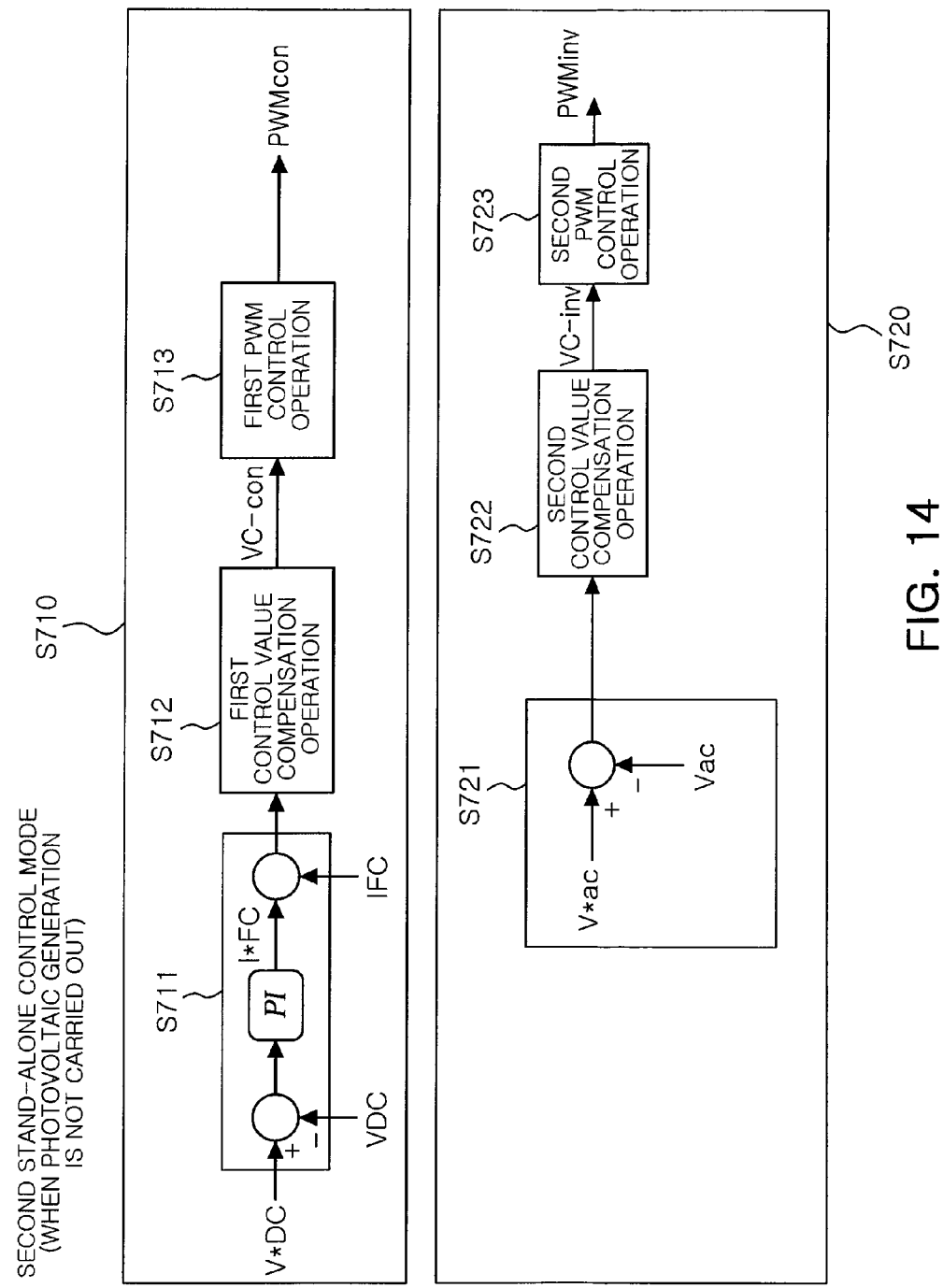
FIG. 14 is a view illustrating the flow of a second stand-alone control mode in which photovoltaic generation is not carried out during the stand-alone operation of the PV-FC hybrid generation system, according to an exemplary embodiment of the present invention.

FIG. 14 is a view illustrating the flow of the second stand-alone control mode in which photovoltaic generation is not carried out during the stand-alone operation of the PV-FC hybrid generation system, according to an exemplary embodiment of the present invention.

Referring to FIGS. 10 and 14, the converter control operation S710 of the second stand-alone control operation S700 may include: calculating a first control error value for DC link control with respect to the DC/DC converter unit 200 in operation S711 (hereinafter also "first calculation operation"); compensating a converter control value VC-con by using the first control error value obtained in the first calculation operation S711, in operation S712 (hereinafter also "first control value compensation operation"); and generating a PWM converter control signal PWM-con by using the converter control value VC-con compensated in the first control value compensation operation S712, and controlling the operation of the DC/DC converter unit 200 by using the PWM converter control signal, in operation S713 (hereinafter also "first PWM control operation").

The first calculation operation S711 of the second stand-alone control operation S700 may be performed such that a voltage error value corresponding to a difference value between a preset DC voltage command value V*DC and the DC voltage VDC is calculated, a preset FC current command value I*FC is compensated by using this voltage error value, and the first control error value corresponding to a difference value between the compensated FC current command value I*FC and the FC current IFC is calculated.

Referring to FIGS. 10 and 14, the inverter control operation S720 of the second stand-alone control operation S700 may include: calculating a second control error value for output constant-voltage control with respect to the DC/AC inverter unit 400 in operation S721 (hereinafter also "second calculation operation"); compensating an inverter control value VC-inv by using the second control error value obtained in the second calculation operation S721, in operation S722 (hereinafter also "second control value compensation operation"); and generating a PWM inverter control signal PWM-inv by using the inverter control value VC-inv compensated in the second control value compensation operation S722, and controlling the operation of the DC/AC inverter unit 400 by using the PWM inverter control signal PWM-inv in operation S723 (hereinafter also "second PWM control operation").

The second calculation operation S721 of the second stand-alone control operation S700 may be performed such that the second control error value corresponding to a difference value between the AC voltage command value V*ac and the AC voltage Vac is generated.

The operation and effect of the present invention will now be described in detail.

The PV-FC hybrid generation system will now be described with reference to FIGS. 1 and 2.

Referring to FIGS. 1 and 2, in the PV-FC hybrid generation system according to the exemplary embodiments of the present invention, the DC/DC converter unit 200 converts an FC output voltage VFC from the fuel cell 110 into a preset voltage, and outputs the converted voltage to the DC link part 300. Here, the fuel cell 110 converts chemical energy into electrical energy.

The fuel cell 110 may output, for example, an FC output voltage ranging from approximately 24 V to 42 V and an FC current IFC up to approximately 50 A. The DC/DC converter unit 200 converts the FC output voltage VFC into approximately 350 V to 380 V required for DC/AC conversion.

The DC link unit 300 commonly connects the output terminal of the DC/DC converter unit 200 with the output terminal of the photovoltaic cell 120 converting photovoltaic energy into electrical energy, and thus links the converted FC output voltage VFC from the DC/DC converter unit 200 with a PV output voltage VPV from the photovoltaic cell 120 to thereby generate a DC voltage VDC. The DC link unit 300 outputs the DC voltage VDC to the DC/AC inverter unit 400.

The photovoltaic cell 120 may include a plurality of photovoltaic cells connected in series, and generate a voltage of, for example, approximately 350 V required for DC/AC conversion when there is sunlight. In order to produce maximum power by using the photovoltaic cell 120, maximum power point tracking for tracking the maximum power point of power generated by the photovoltaic cell 120 needs to be performed.

The DC/AC inverter unit 400 converts the DC voltage VDC from the DC link unit 300 into a preset AC voltage Vac.

Referring to FIG. 2, in the PV-FC hybrid generation system according to this embodiment, the voltage/current detection unit 700 detects voltage and current generated by each of the fuel cell 110, the photovoltaic cell 120 and the DC/AC inverter unit 400 and provides them to the hybrid generation control unit 800.

The hybrid generation control unit 800 may control the operation of the DC/DC converter unit 200 and the DC/AC inverter unit 400 on the basis of the plurality of voltages and currents detected by the voltage/current detection unit 700.

According to the embodiments illustrated in FIGS. 1 and 2, the DC link unit 300 may include a capacitor Cdc. In this case, noise or AC ripple components, which may be included in the DC voltage VDC, may be removed by the capacitor Cdc, so that the DC link unit 300 can provide a more stable DC voltage VDC.

When the DC/AC inverter unit 400 includes the DC/AC inverter 410 and the filter 420, the DC/AC inverter 410 converts the DC voltage VDC from the DC link part 300 into a pulsed voltage, and outputs the pulsed voltage to the filter 420. The filter 420 may convert the pulsed voltage from the DC/AC inverter 410 into the AC voltage Vac.

When the DC/AC inverter unit 400 further includes the grid transmitter 430, the grid transmitter 430 may transmit the AC voltage Vac from the filter 420 to the grid.

Referring to FIG. 2, the voltage/current detection unit 700, according to this embodiment, may detect the FC output voltage VFC and current IFC of the fuel cell 110, the PV output voltage VPV and current IPV of the photovoltaic cell 120, the AC voltage Vac and output current Iout of the DC/AC inverter unit 400, and the grid voltage Vgrid from the grid of the commercial power supply 600.

When the hybrid generation control unit 800 includes the converter controller 810 and the inverter controller 820, the converter controller 810 may control the operation of the Dc/Dc converter unit 200 by using the grid voltage Vgrid and the FC output voltage VFC and current IFC. The inverter controller 820 may control the operation of the DC/AC inverter unit 400 on the basis of the PV output voltage VPV and current IPV from voltage/current detection unit 700.

The PV-FC hybrid generation system according to the present invention is capable of the grid-connected operation using the commercial power supply 600 as well as a stand-alone operation without a connection to the commercial power supply 600 such as in the case of islands and mountainous regions.

Referring to FIGS. 2 and 3, in the grid-connected operation mode, the hybrid generation control unit 800 or each of the converter and inverter controllers 810 and 820, may determine a photovoltaic generation status according to the PV power PPV based on the PV output voltage VPV and current IPV of the photovoltaic cell 120, and perform one of preset first and second grid-connected control modes according to the determined photovoltaic generation status. Here, the first grid-connected control mode refers to a control mode in which photovoltaic generation is not carried out in the grid-connected operation mode, and the second grid-connected control mode refers to a control mode in which photovoltaic generation is carried out in the grid-connected operation mode.

Furthermore, referring to FIGS. 2 and 4, in the stand-alone operation mode, the hybrid generation control unit 800 or each of the converter and inverter controllers 810 and 820 may perform one of preset first and second stand-alone control modes according to the determined photovoltaic generation status regarding whether or not photovoltaic generation is carried out. Here, the first stand-alone control mode is a control mode in which photovoltaic generation is carried out in the stand-alone operation without a grid connection, and the second stand-alone control mode is a control mode in which photovoltaic generation is not carried out in the stand-alone operation without a grid connection Hereinafter, there will be described the first grid-connected control mode in which photovoltaic generation is not carried out and the second grid-connected control mode in which photovoltaic generation is carried out during the grid-connected operation of the PV-FC hybrid generation system according to the present invention with reference to FIGS. 5 and 6.

Referring to FIGS. 5 and 6, the converter controller 810 may include the first calculation part 811, the first control value compensation part 812 and the first PWM control part 813. The inverter controller 820 may include the second calculation part 821, the second control value compensation part 822 and the second PWM control part 823.

The first grid-connected control mode of the PV-FC hybrid generation system according to the present invention will now be described with reference to FIG. 5.

Referring to FIG. 5, the first calculation part 811 of the converter controller 810 calculates a first control error value for constant power control with respect to the DC/DC converter unit 200, and outputs the first control error value to the first control value compensation part 812. The first control value compensation part 812 compensates a converter control value VC-con by using the first control error value from the first calculation part 811, and outputs the compensated converter control value VC-con to the first PWM control part 813. The first PWM control part 813 generates a PWM converter control signal PWM-con by using the compensated converter control value VC-con from the first control value compensation part 812, and controls the operation of the DC/DC converter unit 200 by using the PWM converter control signal PWM-con.

The first calculation part 811 of the converter controller 810, in the first grid-connected control mode, may generate an FC current command value I*FC by dividing a preset FC power command value P*FC by the FC output voltage VFC, and calculate the first control error value corresponding to a difference value between the FC current command value I*FC and the FC current IFC. For example, the first control error value may correspond to a value obtained by subtracting the FC current IFC from the FC current command value I*FC.

Here, the first control value compensation part 812 may be configured as a proportional integrate (PI) controller that removes an error component of the converter control value VC-con by using the first control error value from the first calculation part 811.

The first PWM control part 813 compares the compensated converter control value VC-con from the first control value compensation part 812 with a preset chopping wave reference signal. For example, if the converter control value VC-con is higher than the reference signal, the first PWM control part 813 outputs a high level, and otherwise, if the converter control value VC-con is not higher than the reference signal, the first PWM control part 813 outputs a low level. That is, the first PWM control part 813 generates a PWM converter control signal PWM-con having a pulse width varied according to the magnitude level of the converter control value VC-con.

Referring to FIG. 5, the second calculation part 821 of the inverter controller 820 calculates a second control error value for DC link, grid connection and output current control with respect to the DC/AC inverter unit 400, and outputs the second control error value to the second control value compensation part 822. The second control value compensation part 822 compensates an inverter control value VC-inv by using the second control error value from the second calculation part 821, and outputs the compensated inverter control value VC-inv to the second PWM control part 821. The second PWM control part 823 may generate a PWM inverter control signal PWM-inv by using the compensated inverter control value VC-inv from the second control value compensation part 822, and control the operation of the DC/AC inverter unit 400 by using the PWM inverter control signal PWM-inv.

Here, since the inverter controller 820 controls the output current of the DC/AC inverter unit 400, the DC link voltage of the DC link unit 300 located at the front end of the DC-AC inverter unit 400 can be controlled, and the output power of the DC/AC inverter unit 400 can be controlled accordingly.

The grid connection is to transmit the AC voltage Vac from the filter 420 to the grid via the gird transmitter 430 of the DC/AC inverter unit 400 by synchronizing the phase of the grid voltage with the AC voltage Vac from the filter 420.

When the second calculation part 821 of the inverter controller 820 may include the DC link calculation portion 821-2, the error correction portion 821-4, the DC/AC conversion portion 821-6, and the error calculation portion 821-8, the DC link calculation portion 821-2 calculates a current error value corresponding to a difference value between a preset DC voltage command value V*DC and the DC voltage VDC, compensates a current command value by using the current error value, and provides the compensated current command value to the error correction portion 821-4.

The error correction portion 821-4 calculates a current correction value Iout_ff by dividing a preset FC power command value P*FC by the grid voltage Vgrid, corrects the compensated current command value from the DC link calculation portion 821-2 by using the current correction value Iout-ff, and provides the corrected current command value to the DC/AC conversion portion 821-6. The DC/AC conversion portion 821-6 detects the phase of the grid voltage Vgrid, converts the current command value of the error correction portion 821-4 into an AC output current command value I*out by synchronizing the current command value with the detected phase, and provides the converted output current command value to the error calculation portion 821-8. The error calculation portion 821-8 generates the second control error value corresponding to a difference value between the output current Iout and the output current command value I*out from the DC/AC conversion portion 821-6.

For example, the current error value at the DC link calculation portion 821-2 may correspond to a difference value obtained by subtracting the DC voltage VDC from the preset DC voltage command value V*DC, and the compensation of the current command value at the DC link calculation portion 821-2 may be realized by a PI controller that removes a current error of the current command value by using the current error value.

The second grid-connected control mode of the PV-FC hybrid generation system according to the present invention will now be described with reference to FIG. 6.

Referring to FIG. 6, the first calculation part 811 of the converter controller 810 calculates a first control error value for constant power control with respect to the DC/DC converter unit 200, and provides the first control error value to the first control value compensation part 812. The first control value compensation part 812 compensates a converter control value VC-con by using the first control error value from the first calculation part 811, and provides the compensated converter control value VC-con to the first PWM control part 813. The first PWM control part 813 may generate a PWM converter control signal PWM-con by using the compensated converter control value VC-con from the first control value compensation part 812, and control the operation of the DC/DC converter unit 200 by using the PWM converter control signal PWM-con.

The first calculation part 811 of the converter controller 810, in the second grid-connected control mode, may generate an FC current command value I*FC by dividing a preset FC power command value P*FC by the FC output voltage VFC, and calculate the first control error value corresponding to a difference value between the FC current command value I*FC and the FC current IFC.

Referring to FIG. 6, the second calculation part 821 of the inverter controller 820 calculates a second control error value for the maximum power point tracking (MPPT), DC link, grid connection and output current control with respect to the DC/AC inverter unit 400, and provides the second control error value to the second control value compensation part 822. The second control value compensation part 822 compensates an inverter control value VC-inv by using the second control error value from the second calculation part 821, and provides the compensated inverter control value VC-inv to the second PWM control part 823. The second PWM control part 823 may generate a PWM inverter control signal PWM-inv by using the compensated inverter control value VC-inv from the second control value compensation part 822, and control the operation of the DC/AC inverter unit 400 by using the PWM inverter control signal PWM-inv.

The MPPT will now be briefly described. The MPPT refers to the control operation of tracking down the maximum power point while varying one of resistance, voltage and current associated with power in order to produce maximum power, in consideration that the photovoltaic cell has its maximum power point.

When the second calculation part 821 of the inverter controller 820 includes the MPPT portion 821-1, the DC link calculation portion 821-2, the error correction portion 821-4, the DC/AC conversion portion 821-6, and the error calculation portion 821-8, the MPPT portion 821-1 generates a PV output voltage command value V*PV by performing preset MPPT by using the PV output voltage VPV and current IPV, and provides the PV output voltage command value V*PV to the DC link calculation portion 821-2. The DC link calculation portion 821-2 calculates a voltage error value corresponding to a difference value between the PV output voltage VPV and the PV output voltage command value (V*PV), compensates an output current command value by using the voltage error value, and provides the compensated output current command value to the error correction portion 821-4.

Subsequently, the error correction portion 821-4 calculates a power command value by adding a preset FC power command value P*FC and a preset PV power command value P*PV, calculates a current correction value Iout_ff by dividing the power command value by the grid voltage Vgrid, corrects the compensated output current command value of the DC link calculation portion 821-2 by using the current correction value Iout_ff, and provides the corrected current command value to the DC/AC conversion portion 821-6. The DC/AC conversion portion 821-6 detects the phase of the grid voltage Vgrid, converts the current command value into an AC output current command value I*out by synchronizing the current command value with the detected phase, and provides the converted current command value to the error calculation portion 821-8. The error calculation portion 821-8 may generate a second control error value corresponding to a difference value between the output current command value I*out from the DC/AC conversion portion 821-6 and the output current Iout.

Hereinafter, there will be described the first stand-alone control mode in which photovoltaic generation is carried out, and the second stand-alone control mode in which photovoltaic generation is not carried out during the stand-alone operation of the PV-FC hybrid generation system according to the present invention.

Referring to FIGS. 7 and 8, the converter controller 810 may include the first calculation part 811, the first control value compensation part 812 and the first PWM control part 813. The inverter controller 820 may include the second calculation part 821, the second control value compensation part 822 and the second PWM control part 823.

Referring to FIG. 7, the first stand-alone control mode of the PV-FC hybrid generation system will now be described.

Referring to FIG. 7, the first calculation part 811 of the converter controller 810 calculates a first control error value for current control with respect to the DC/DC converter unit 200, and provides the first control error value to the first control value compensation part 812. The first control value compensation part 812 compensates a converter control value VC-con by using the first control error value from the first calculation part 811, and provides the compensated converter control value VC-con to the first PWM control part 813. The first PWM control part 813 may generate a PWM converter control signal PWM-con by using the compensated converter control value VC-con from the first control value compensation part 812, and control the operation of the DC/DC converter unit 200 by using the PWM converter control signal.

In each of the first grid-connected control mode, the second grid-connected control mode and the first stand-alone control mode, the first calculation part 811 of the converter controller 810 may generate an FC current command value I*FC by dividing a preset FC power command value P*FC by the FC output voltage VFC, and calculate the first control error value corresponding to a difference value between the FC current command value I*FC and the FC current IFC.

Here, the output power Pout may be calculated by using the AC voltage Vac and output current Iout of the DC/AC inverter unit 400, the PV power PPV may be calculated by using the PV output voltage VPV and current IPV of the photovoltaic cell 120, and the FC power command value P*FC may correspond to a difference value between the output power Pout and the PV power PPV.

Referring to FIG. 7, the second calculation part 821 of the inverter controller 820 calculates a second control error value for the MPPT, DC link and output constant-voltage control with respect to the DC/AC inverter unit 400, and provides the second control error value to the second control value compensation part 822. The second control value compensation part 822 compensates an inverter control value VC-inv by using the second control error value from the second calculation part 821, and provides the compensated inverter control value VC-inv to the second PWM control part 823. The second PWM control part 823 may generate a PWM inverter control signal PWM-inv by using the compensated inverter control value VC-inv from the second control value compensation part 822, and control the operation of the DC/AC inverter unit 400 by using the PWM inverter control signal PWM-inv.

When the second calculation part 821 of the inverter controller 820 includes the MPPT portion 821-1, the DC link calculation portion 821-2, the DC/AC conversion portion 821-6, and the error calculation portion 821-8, the MPPT portion 821-1 generates a PV output voltage command value V*PV by performing preset MPPT by using the PV output voltage VPV and current IPV, and provides the PV output voltage command value V*PV to the DC link calculation portion 821-2.

Subsequently, the DC link calculation portion 821-2 calculates a voltage error value corresponding to a difference value between the PV output voltage VPV and the PV output voltage command value V*PV, compensates an output voltage command value V*out by using the voltage error value, and provides the compensated output voltage command value V*out to the DC/AC conversion portion 821-6. The DC/AC conversion portion 821-6 converts the output voltage command value from the DC link calculation portion 821-2 into an AC output voltage command value V*out, and provides the converted output voltage command value V*out to the error calculation portion 821-8. The error calculation portion 821-8 may generate the second control error value corresponding to a difference value between the output voltage command value V*out from the DC/AC conversion portion 821-6 and the output voltage Vout.

The second stand-alone control mode of the PV-FC hybrid generation system according to the present invention will now be described with reference to FIG. 8.

Referring to FIG. 8, the first calculation part 811 of the converter controller 810 calculates a first control error value for DC link control with respect to the DC/DC converter unit 200, and provides the first control error value to the first control value compensation part 812. The first control value compensation part 812 compensates a converter control value VC-con by using the first control error value from the first calculation part 811, and provides the compensated converter control value VC-con to the first PWM control part 813. The first PWM control part 813 may generate a PWM converter control signal PWM-con by using the compensated converter control value VC-con from the first control value compensation part 812, and control the operation of the DC/DC converter unit 200 by using the PWM converter control signal.

Here, the first calculation part 811 of the converter controller 810, in the second stand-alone control mode, may calculate a voltage error value corresponding to a difference value between a preset DC voltage command value V*DC and the DC voltage VDC, compensate a preset FC current command value I*FC by using this voltage error value, and calculate the first control error value corresponding to a difference value between the compensated FC current command value I*FC and the FC current IFC.

Referring to FIG. 8, the second calculation part 821 of the inverter controller 820 calculates a second control error value for output constant-voltage control with respect to the DC/AC inverter unit 400, and provides the second control error value to the second control value compensation part 822. The second control value compensation part 822 compensates an inverter control value VC-inv by using the second control error value from the second calculation part 821, and provides the compensated inverter control value VC-inv to the second PWM control part 823. The second PWM control part 823 may generate a PWM inverter control signal PWM-inv by using the compensated inverter control value VC-inv from the second control value compensation part 822, and control the operation of the DC/AC inverter unit 400 by using the PWM inverter control signal PWM-inv.

Here, in the second stand-alone control mode, the second calculation part 821 may generate the second control error value corresponding to a difference value between the AC voltage command value V*ac and the AC voltage Vac.

Hereinafter, the method of controlling the PV-FC hybrid generation system according to the present invention will now be described with reference to FIGS. 2, 3, 4, and 9 to 14.

Referring to FIGS. 2, 3, and 9 to 14, the PV-FC hybrid generation method, according to the exemplary embodiments illustrated in FIGS. 9 and 10, is applicable to the PV-FC hybrid generation system that includes the DC/DC converter unit 200 converting an FC output voltage VFC from the fuel cell 110 into a preset voltage, the DC link unit 300 generating a DC voltage VDC by linking the converted FC output voltage VFC from the DC/DC converter unit 200 with a PV output voltage VPV from the photovoltaic cell 120, and the DC/AC inverter unit 400 converting the DC voltage VDC from the DC link unit 300, into a preset AC voltage Vac.

According to the method of controlling the PV-FC hybrid generation system according to the exemplary embodiment of FIG. 9, voltage and current, required to determine whether or not the grid connection is made and photovoltaic generation is carried out, are detected first in the system start operation S50.

In the grid-connected photovoltaic-generation determining operation S200, a grid-connected operation mode is performed when the grid connection is available, and a photovoltaic generation status is determined by comparing preset minimum PV power Pmin with PV power PPV calculated based on the PV output voltage VPV and output current IPV of the photovoltaic cell 120. For example, if the PV power PPV is higher than the minimum PV power Pmin, it is determined that effective photovoltaic generation is carried out, and otherwise, if the PV power PPV is not higher than the minimum PV power Pmin, it is determined that effective photovoltaic generation is not carried out.

Subsequently, in the first grid-connected operation mode of the first grid-connected control operation S400, the converter control operation S410 and the inverter control operation S420 are performed when it is determined in the photovoltaic-generation determining operation S200 that photovoltaic generation is not carried out in the grid-connected operation mode.

Here, in the converter control operation S410, constant power is controlled with respect to the DC/DC converter unit 200. In the inverter control operation 5420, the DC link, grid connection and output current are controlled with respect to the DC/AC inverter unit 400.

Thereafter, in the second grid-connected operation mode of the second grid-connected control operation S500, the converter control operation 5510 and the inverter control operation S520 are performed when it is determined in the photovoltaic-generation determining operation S200 that photovoltaic generation is carried out in the grid-connected operation mode.

In the converter control operation S510, constant power may be controlled with respect to the DC/DC converter unit 200. In the inverter control operation S520, the MPPT, DC link, grid connection and output current may be controlled with respect to the DC/AC inverter unit 400.

According to the method of controlling the PV-FC hybrid generation system according to the exemplary embodiment of FIG. 10, voltage and current, required to determine whether or not the grid connection is made and photovoltaic generation is carried out, are detected first in the system start operation S50.

Thereafter, in the operation mode determining operation S100, it is determined whether the operation mode is a grid-connected operation mode or a stand-alone operation mode according to the grid voltage Vgrid.

In the grid-connected photovoltaic-generation determining operation S200, a photovoltaic generation status is determined by comparing preset minimum PV power Pmin with PV power PPV calculated based on the PV output voltage VPV and output current IPV of the photovoltaic cell 120 when the grid-connected operation mode is performed.

In the stand-alone photovoltaic generation determining operation 300, a photovoltaic generation status is determined by comparing preset minimum PV power Pmin with the PV power PPV of the photovoltaic cell 120 when the stand-alone operation mode is performed.

In the first grid-connected operation mode of the first grid-connected control operation S400, the converter control operation S410 and the inverter control operation S420 are performed when it is determined in the grid-connected photovoltaic-generation determining operation S200 that photovoltaic generation is not carried out in the grid-connected operation mode. That is, in the converter control operation S410, constant power is controlled with respect to the DC/DC converter unit 200. In the inverter control operation S420, the DC link, grid connection and output current are controlled with respect to the DC/AC inverter unit 400.

In the second grid-connected operation mode of the second grid-connected control operation S500, the converter control operation S510 and the inverter control operation S520 are performed when it is determined in the grid-connected photovoltaic-generation determining operation S200 that photovoltaic generation is carried out in the grid-connected operation mode. That is, in the converter control operation S510, constant power may be controlled with respect to the DC/DC converter unit 200, and in the inverter control operation S510, the MPPT, DC link, grid connection and output current may be controlled with respect to the DC/AC inverter unit 400.

In the first stand-alone control operation mode of the first stand-alone control operation S600, the converter control operation S610 and the inverter control operation 620 are performed when photovoltaic generation is carried out in the stand-alone operation. That is, in the converter control operation S610, the current may be controlled with respect to the DC/DC converter unit 200, and in the inverter control operation S620, the MPPT, DC link and output constant voltage may be controlled with respect to the DC/AC inverter unit 400.

In the second stand-alone operation mode of the second stand-alone control control operation S700, the converter control operation S710 and the inverter control operation S720 are performed when it is determined in the stand-alone photovoltaic generation determining operation S300 that photovoltaic generation is not carried out in the stand-alone operation mode. That is, in the converter control operation S710, the DC link may be controlled with respect to the DC/DC converter unit 200, and in the inverter control operation S720, output constant voltage may be controlled with the DC/AC inverter unit 400.

According to the exemplary embodiments depicted in FIGS. 9 and 10, the system start operation S50, the operation mode determining operation S100, the grid-connected photovoltaic generation determining operation S200, the stand-alone photovoltaic generation operation 5300, the first grid-connected control operation S400 and the second grid-connected control operation 5500 may each detect the FC output voltage VFC and current IFC of the fuel cell 110, the PV output voltage VPV and current IPV of the photovoltaic cell 120, the AC voltage Vac and output current Iout of the DC/AC inverter unit 400, and the Vgrid of the grid of the commercial power supply 600.

The first stand-alone control operation and the second stand-alone control operation may each be performed so as to detect the FC output voltage VFC and current IFC of the fuel cell 110, the PV output voltage VPV and current IPV of the photovoltaic cell 120, and the AC voltage Vac and output current Iout of the DC/AC inverter unit 400.

Referring to FIGS. 11 and 12, the method of controlling the PV-FC hybrid generation system according to the present invention includes the first grid-connected control operation S400 performing the first grid-connected control mode when photovoltaic generation is not carried out during the grid-connected operation, and the second grid-connected control operation S500 performing the second grid-connected control mode when photovoltaic generation is carried out during the grid-connected operation.

In the method of controlling the PV-FC hybrid generation system according to the present invention, the first grid-connected control operation 5400 performing the first grid-connected control mode will now be described with reference to FIG. 11.

Referring to FIG. 11, in the first calculation operation S411 of the converter control operation S410 of the first grid-connected control operation S400, a first control error value for constant power control with respect of the DC/DC converter unit 200 is calculated, and provided to the first control value compensation operation 5412. In the first control value compensation operation S412, a converter control value VC-con is compensated by using the first control error value obtained in the first calculation operation S411, and is provided to the first PWM control operation S413. In the first PWM control operation S413, a PWM converter control signal PWM-con may be generated by using the compensated converted control value VC-con obtained in the first control value compensation operation S412, and the operation of the DC/DC converter unit 200 may be controlled by using the PWM converter control signal.

The first calculation operation S411 of the first grid-connected control operation S400 may be conducted such that an FC current command value I*FC is generated by dividing a preset FC power command value P*FC by the FC output voltage VFC, and the first control error value corresponding to a difference value between the FC current command value I*FC and the FC current IFC is calculated.

Referring to FIG. 11, in the second calculation operation 5421 of the inverter control operation S420 of the first grid-connected control operation 5400, a second control error value for DC link, grid connection and output current control with respect to the DC/AC inverter unit 400 is calculated and provided to the second control value compensation operation 5422. In the second control value compensation operation S422, an inverter control value VC-inv is compensated by using the second control error value obtained in the second calculation operation 5421, and is provided to the second PWM control operation 5423. In the second PWM control operation S423, a PWM inverter control signal PWM-inv may be generated by using the compensated inverter control value VC-inv obtained in the second control value compensation operation S422, and the operation of the DC/AC inverter unit 400 may be controlled by using the PWM inverter control signal PWM-inv in operation 5423.

Here, in the DC link calculation operation S421-2 of the second calculation operation S421 of the first grid-connected control operation S400, a current error value corresponding to a difference value between a preset DC voltage command value V*DC and the DC voltage VDC is calculated, and a current command value is compensated by using the current error value and provided to the error correction operation S421-4. In the error correction operation S421-4, a current correction value Iout_ff is calculated by dividing a preset FC power command value P*FC by the grid voltage Vgrid, and the current command value compensated in the DC link calculation operation S421-2 is corrected by using the current correction value Iout-ff and provided to the DC/AC conversion operation S421-6.

In the DC/AC conversion operation S421-6, the phase of the grid voltage Vgrid is detected, and the current command value from the error correction operation S421-4 is converted into an AC output current command value I*out by synchronizing the current command value with the detected phase, and is provided to the error calculation operation S421-8. In the error calculation operation S421-8, the second control error value corresponding to a difference value between the output current Iout and the output current command value I*out from the DC/AC conversion operation S421-6 may be generated.

In the method of controlling the PV-FC hybrid generation system according to the present invention, the second grid-connected control operation 5500 performing the second grid-connected control mode will now be described with reference to FIG. 12.

Referring to FIG. 12, in the first calculation operation S511 of the converter control operation S510 of the second grid-connected control operation S500, a first control error value for constant power control with respect to the DC/DC converter unit 200 is calculated and provided to the first control value compensation operation S512. In the first control value compensation operation S512, a converter control value VC-con is compensated by using the first control error value obtained in the first calculation operation S511, and is provided to the first PWM control operation S513. In the first PWM control operation 5513, a PWM converter control signal PWM-con may be generated by using the converter control value VC-con compensated in the first control value compensation operation S512, and the operation of the DC/DC converter unit 200 may be controlled by using the PWM converter control signal PWM-con.

The first calculation operation S511 of the second grid-connected control operation S500 may be performed such that an FC current command value I*FC is generated by dividing a preset FC power command value P*FC by the FC output voltage VFC, and the first control error value corresponding to a difference value between the FC current command value I*FC and the FC current IFC is calculated.

Referring to FIG. 12, in the second calculation operation S521 of the inverter control operation S520 of the second grid-connected control operation S500, a second control error value for the MPPT, DC link and output constant-voltage control with respect to the DC/AC inverter unit 400 is calculated and provided to the second control value compensation operation S522. In the second control value compensation operation S522, an inverter control value VC-inv is compensated by using the second control error value from the second calculation operation S521, and is provided to the second PWM control operation S523. In the second PWM control operation S523, a PWM inverter control signal PWM-inv may be generated by using the inverter control value VC-inv compensated in the second control value compensation operation S522, and the operation of the DC/AC inverter unit 400 may be controlled by using the PWM inverter control signal PWM-inv.

In the MPPT operation S521-1 of the second calculation operation 521 of the second grid-connected control operation S500, a PV output voltage command value V*PV is generated by performing preset MPPT by using the PV output voltage VPV and current IPV, and is provided to the DC link calculation operation S521-2. In the DC link calculation operation S521-2, a voltage error value corresponding to a difference value between the PV output voltage VPV and the PV output voltage command value V*PV is calculated, and an output current command value V*out is compensated by using the voltage error value and provided to the error correction operation S521-4.

Subsequently, in the error correction operation 521-4, a power command value is calculated by adding a preset FC power command value P*FC and a preset PV power command value P*PV, a current correction value Iout_ff is calculated by dividing the power command value by the grid voltage Vgrid, and the output current command value compensated in the DC link calculation operation S521-2 is corrected by using the current correction value Iout_ff and is provided to the DC/AC conversion operation S521-6. In the DC/AC conversion operation S521-6, the phase of the grid voltage Vgrid is detected, and the current command value is converted into an AC output current command value I*out by synchronizing the current command value with the detected phase, and is provided to the error calculation operation S521-8. In the error calculation operation S521-8, a second control error value corresponding to a difference value between the output current command value I*out from the DC/AC conversion operation S521-6, and the output current Iout may be generated.

In the method of controlling the PV-FC hybrid generation system according to the present invention, the first stand-alone control operation S600 performing the first stand-alone control mode will now be described with reference to FIG. 13.

Referring to FIG. 13, in the first calculation operation 5611 of the converter control operation 5610 of the first stand-alone control operation 5600, a first control error value for current control with respect to the DC/DC converter unit 200 is calculated and provided to the first control value compensation operation S612. In the first control value compensation operation S612, a converter control value VC-con is compensated by using the first control error value obtained in the first calculation operation S611, and is provided to the first PWM control operation S613. In the first PWM control operation S613, a PWM converter control signal PWM-con may be generated by using the compensated converter control value VC-con obtained in the first control value compensation operation S612, and the operation of the DC/DC converter unit 200 may be controlled by using the PWM converter control signal PWM-con.

The first calculation operation 5611 of the first stand-alone control operation S600 may be performed such that an FC current command value IF is generated by dividing a preset FC power command value P*FC by the FC output voltage VFC, and the first control error value corresponding to a difference value between the FC current command value I*FC and the FC current IFC is calculated.

Here, the output power Pout may be calculated by using the AC voltage Vac and output current Iout of the DC/AC inverter unit 400, the PV power PPV may be calculated by using the PV output voltage VPV and current IPV of the photovoltaic cell 120, and the FC power command value P*FC may correspond to a difference value between the output power Pout and the PV power PPV.

Referring to FIG. 13, in the second calculation operation 5621 of the inverter control operation 5620 of the first stand-alone control operation S60, a second control error value for the MPPT, DC link and output constant-voltage control with respect to the DC/AC inverter unit 400 is calculated and provided to the second control value compensation operation S622. In the second control value compensation operation S622, an inverter control value VC-inv is compensated by using the second control error value obtained in the second calculation operation S621, and is provided to the second PWM control operation S623.

In the second PWM control operation S623, a PWM inverter control signal PWM-inv may be generated by using the compensated inverter control value VC-inv obtained in the second control value compensation operation S622, and the operation of the DC/AC inverter unit 400 may be controlled by using the PWM inverter control signal PWM-inv.

In the MPPT operation S621-1 of the second calculation operation S621 of the first stand-alone control operation S600, a PV output voltage command value V*PV is generated by performing preset MPPT by using the PV output voltage VPV and current IPV, and is provided to the DC link calculation operation S621-2. In the DC link calculation operation S621-2, a voltage error value corresponding to a difference value between the PV output voltage VPV and the PV output voltage command value V*PV is calculated, and an output voltage command value V*out is compensated by using the voltage error value and is provided to the DC/AC conversion operation S621-6.

In the DC/AC conversion operation S621-6, the output voltage command value from the DC link calculation operation S621-2 is converted into an AC output voltage command value V*out and is provided to the error calculation operation S621-8. In the error calculation operation S621-8, the second control error value corresponding to a difference value between the output voltage command value V*out from the DC/AC conversion operation S621-6 and the output voltage Vout may be generated.

In the method of controlling the PV-FC hybrid generation system according to the present invention, the second stand-alone control operation S700 performing the first stand-alone control mode will now be described with reference to FIG. 14.

Referring to FIG. 14, in the first calculation operation S711 of the converter control operation S710 of the second stand-alone control operation S700, a first control error value for DC link control with respect to the DC/DC converter unit 200 is calculated and provided to the first control value compensation operation S712. In the first control value compensation operation S712, a converter control value VC-con is compensated by using the first control error value obtained in the first calculation operation S711, and is provided to the first PWM control operation S713. In the first PWM control operation S713, a PWM converter control signal PWM-con may be generated by using the converter control value VC-con compensated in the first control value compensation operation S712, and the operation of the DC/DC converter unit 200 may be controlled by using the PWM converter control signal.

In the first calculation operation S711 of the second stand-alone control operation S700, a voltage error value corresponding to a difference value between a preset DC voltage command value V*DC and the DC voltage VDC may be calculated, a preset FC current command value I*FC may be compensated by using this voltage error value, and the first control error value corresponding to a difference value between the compensated FC current command value I*FC and the FC current IFC may be calculated.

Referring FIG. 14, in the second calculation operation of the inverter control operation S720 of the second stand-alone control operation 5700, a second control error value for output constant-voltage control with respect to the DC/AC inverter unit 400 is calculated and provided to the second control value compensation operation S722. In the second control value compensation operation S722, an inverter control value VC-inv is compensated by using the second control error value obtained in the second calculation operation S721, and is provided to the second PWM control operation S723. In the second PWM control operation S723, a PWM inverter control signal PWM-inv may be generated by using the inverter control value VC-inv compensated in the second control value compensation operation S722, and the operation of the DC/AC inverter unit 400 may be controlled by using the PWM inverter control signal PWM-inv.

In the second calculation operation S721 of the second stand-alone control operation S700, the second control error value corresponding to a difference value between the AC voltage command value V*ac and the AC voltage Vac may be generated.

In terms of the power control, the hybrid generation system according to the present invention employs an algorithm by which the fuel cell continuously generates power with rated capacity and the photovoltaic cell outputs its maximum power during effective photovoltaic generation to thereby support the fuel cell. This allows for the independent control of the output power of the two independent power sources. Furthermore, in order to supply constant power to the load, a control operation may be performed such that the photovoltaic cell generates maximum power and the fuel cell generates power corresponding to the difference between the set power level and the power level generated by the photovoltaic cell.

In addition, the output voltage of the DC/DC converter unit may be generated according to a voltage command value obtained by adding the output voltage fluctuation of the photovoltaic cell and the voltage fluctuation caused by the MPPT control of the DC/AC inverter unit. The DC/AC inverter unit may operate using the MPPT and inverting for the maximum power output of the photovoltaic cell, the grid connection and protection coordination algorithm.

When the power output of the photovoltaic cell becomes lower than the minimum power value due to sunset or environmental conditions, the MPPT mode is terminated. After sunset, the DC/DC converter unit may be controlled so as to continuously follow command power in response to a power command, and the DC/AC inverter unit may perform the DC link voltage control, the output current control and the grid connection operation.

The hybrid generation system and the method of controlling the same, according to the present invention, is associated with a system that operates two energy sources of a photovoltaic cell and a fuel cell in combination, and a control method thereof. This hybrid generation system is driven by a single DC/DC converter unit and a single DC/AC inverter unit, and is capable of voltage, current and power control for hybrid generation using a single hybrid generation controller, so that the reduction of manufacturing costs, system loss and volume can be achieved.

Furthermore, the hybrid generation system is designed such that the output voltage of the photovoltaic is greater than the minimum DC link voltage for DC/AC conversion.

The hybrid generation system according to the present invention has superior system efficiency since the numbers of converters and inverters used are reduced by 50% as compared with the related art system hardware using two DC/DC converter units and two DC/AC inverter units. Furthermore, the system size is reduced by about 40%, and the manufacturing cost also reduced by about 30% or more, so that the hybrid generation system according to the present invention can be implemented with low cost and ensure price competitiveness. Also, the practical PV-FC hybrid generation system can be realized and lead to power generation using ultimate eco-friendly infinite energy sources. Accordingly, the PV-FC hybrid generation system can gain an early edge in the market.

As set forth above, according to exemplary embodiments of the invention, the PV-FC hybrid generation system using a single converter and a single inverter is realized, so that the number of expensive converters and inverters being used therein can be reduced to thereby achieve a reduction in the size and manufacturing cost.

Furthermore, the PV-FC hybrid generation system performs an optimum control mode among a plurality of preset control modes according to whether or not the grid connection is made and power generation is carried out, thereby allowing for the power control of the hybrid generation system suitable for the environmental conditions.

While the present invention has been shown and described in connection with the exemplary embodiments, it will be apparent to those skilled in the art that modifications and variations can be made without departing from the spirit and scope of the invention as defined by the appended claims.

What is claimed is:

1. A photovoltaic and fuel cell (PV-FC) hybrid generation system, the PV-FC hybrid generation system comprising:
a DC/DC converter unit configured to convert an FC output voltage from a fuel cell into a preset voltage;
a DC link unit directly connecting an output terminal of a photovoltaic cell and an output terminal of the DC/DC converter unit, and linking the converted FC output voltage from the DC/DC converter unit with a PV output voltage from the photovoltaic cell to generate a DC voltage;
a DC/AC inverter unit configured to convert the DC voltage from the DC link unit into a preset AC voltage;
a voltage/current detection unit configured to detect a voltage and a current generated by each of the fuel cell, the photovoltaic cell, and the DC/AC inverter unit; and
a hybrid generation control unit configured to control operations of the DC/DC converter unit and the DC/AC inverter unit on the basis of the voltages and currents detected by the voltage/current detection unit, wherein
the hybrid generation control unit comprises a converter controller configured to control an operation of the DC/DC converter unit by using a grid voltage from a grid of a commercial power supply, and the FC output voltage and current of the fuel cell,
the converter controller comprises a first calculation part configured to calculate a first control error value for constant power control with respect to the DC/DC converter unit in the first grid-connected control mode, the first calculation part is configured to generate an FC current command value by dividing a preset FC power command value by the FC output voltage in each of the first grid-connected control mode, the second grid-connected control mode and a first standalone control mode, and calculate the first control error value corresponding to a difference value between the FC current command value and the FC current.

2. The PV-FC hybrid generation system of claim 1, wherein the DC link unit comprises a capacitor connected between the ground and a common connection node to which the output terminal of the photovoltaic cell and the output terminal of the DC/DC converter unit are commonly connected.

3. The PV-FC hybrid generation system of claim 2, wherein the DC/AC inverter unit comprises:
- a DC/AC inverter configured to convert the DC voltage from the DC link unit into a pulsed voltage;
- a filter configured to filter the pulsed voltage from the DC/AC inverter in order to shape the pulsed DC voltage into the AC voltage; and
- a grid transmitter configured to transmit the AC voltage from the filter to a grid.

4. The PV-FC hybrid generation system of claim 1, wherein the voltage/current detection unit is configured to detect the FC output voltage and current of the fuel cell, the PV output voltage and current of the photovoltaic cell, the AC voltage and output current of the DC/AC inverter unit, and the grid voltage.

5. The PV-FC hybrid generation system of claim 4, wherein the hybrid generation control unit further comprises:
- an inverter controller configured to control an operation of the DC/AC inverter unit on the basis of the PV output voltage and current from the voltage/current detection unit.

6. The PV-FC hybrid generation system of claim 5, wherein, in a grid-connected operation mode, each of the converter controller and the inverter controller is configured to determine a photovoltaic generation status according to PV power based on the PV output voltage and current of the photovoltaic cell, and to perform one of preset first and second grid-connected control modes according to the determined photovoltaic generation status regarding whether or not photovoltaic generation is carried out, and wherein the first grid-connected control mode is a control mode in which photovoltaic generation is not carried out in the grid-connected operation mode, and the second grid-connected control mode is a control mode in which photovoltaic generation is carried out in the grid-connected operation mode.

7. The PV-FC hybrid generation system of claim 4, wherein, in a grid-connected operation mode, the hybrid generation control unit is configured to determine a photovoltaic generation status according to PV power based on the PV output voltage and current of the photovoltaic cell, and to perform one of preset first and second grid-connected control modes according to the determined photovoltaic generation status regarding whether or not photovoltaic generation is carried out, and wherein the first grid-connected control mode is a control mode in which photovoltaic generation is not carried out in the grid-connected operation mode, and the second grid-connected control mode is a control mode in which photovoltaic generation is carried out in the grid-connected operation mode.

8. The PV-FC hybrid generation system of claim 6, wherein the converter controller further comprises:

a first control value compensation part configured to compensate a converter control value by using the first control error value from the first calculation part; and a first PWM control part configured to generate a PWM converter control signal by using the compensated converter control value from the first control value compensation part, and to control an operation of the DC/DC converter unit by using the PWM converter control signal.

9. The PV-FC hybrid generation system of claim 8, wherein the inverter controller comprises:
- a second calculation part configured to calculate a second control error value for DC link, grid connection, and output current control with respect to the DC/AC inverter unit in the first grid-connected control mode;
- a second control value compensation part configured to compensate an inverter control value by using the second control error value from the second calculation part; and
- a second PWM control part configured to generate a PWM inverter control signal by using the compensated inverter control value from the second control value compensation part, and to control an operation of the DC/AC inverter unit by using the PWM inverter control signal.

10. The PV-FC hybrid generation system of claim 9, wherein the second calculation part of the inverter controller comprises:
- a DC link calculation portion configured to calculate a current error value corresponding to a difference value between a preset DC voltage command value and the DC voltage in the first grid-connected control mode, and to compensate a current command value by using the current error value;
- an error correction portion configured to calculate a current correction value by dividing the preset FC power command value by the grid voltage, and to correct the compensated current command value from the DC link calculation portion by using the current correction value;
- a DC/AC conversion portion configured to detect a phase of the grid voltage, and to convert the current command value from the error correction portion by synchronizing the current command value with the detected phase; and
- an error calculation portion configured to generate the second control error value corresponding to a difference value between the output current command value from the DC/AC conversion portion and the output current.

11. The PV-FC hybrid generation system of claim 6, wherein the converter controller comprises:
- a first calculation part calculating a first control error value for constant power control with respect to the DC/DC converter unit in the second grid-connected control mode;
- a first control value compensation part compensating a converter control value by using the first control error value from the first calculation part; and
- a first PWM control part generating a PWM converter control signal by using the compensated converter control value from the first control value compensation part, and controlling an operation of the DC/DC converter unit by using the PWM converter control signal.

12. The PV-FC hybrid generation system of claim 11, wherein the inverter controller comprises:
a second calculation part calculating a second control error value for maximum power point control (MPPT), DC link, grid connection and output current control with respect to the Dc/AC inverter unit in the second grid-connected control mode;

a second control value compensation part compensating an inverter control value by using the second control error value from the second calculation part; and a second PWM control part generating a PWM inverter control signal by using the compensated inverter control value from the second control value compensation part, and controlling an operation of the DC/AC inverter by using the PWM inverter control signal.

13. The PV-FC hybrid generation system of claim 12, wherein the first calculation part of the converter controller generates an FC current command value by dividing a preset FC power command value by the FC output voltage in the second grid-connected control mode, and calculates the first control error value corresponding to a difference value between the FC current command value and the FC current.

14. The PV-FC hybrid generation system of claim 13, wherein the second calculation part of the inverter controller comprises:
a maximum power point tracking (MPPT) portion generating a PV output voltage command value by performing preset MPPT by using the PV output voltage and current in the second grid-connected control mode;
a DC link calculation portion calculating a voltage error value corresponding to a difference value between the PV output voltage and the PV output voltage command value, and compensating an output current command value by using the voltage error value;
an error correction portion calculating a power command value by adding a preset FC power command value and a preset PV power command value, calculating a current correction value by dividing the power command value by the grid voltage, and correcting the compensated output current command value of the DC link calculation portion by using the current correction value;
a DC/AC conversion portion detecting a phase of the grid voltage, and converting the current command value into an AC output current command value by synchronizing the current command value with the detected phase; and
an error calculation portion generating the second control error value corresponding to a difference value between the output current command value from the DC/AC conversion portion and the output current.

15. The PV-FC hybrid generation system of claim 5, wherein the converter controller and the inverter controller each determine whether or not a grid connection is made according to the grid voltage, determine a photovoltaic generation status regarding whether or not photovoltaic generation is carried out according to PV power based on the PV output voltage and current of the photovoltaic cell, and perform one of preset first and second grid-connected control modes and first and second stand-alone control modes according to whether or not the grid connection is made and the photovoltaic generation is carried out,
wherein the first grid-connected control mode is a control mode in which photovoltaic generation is not carried out in a grid-connected operation mode, the second grid-connected control mode is a control mode in which photovoltaic generation is carried out in the grid-connected operation mode, the first stand-alone control mode is a control mode in which photovoltaic generation is carried out in a stand-alone operation without a grid connection, and the second stand-alone control mode is a control mode in which photovoltaic generation is not carried out in the stand-alone operation without a grid connection.

16. The PV-FC hybrid generation system of claim 4, wherein the hybrid generation control unit determines whether an operation mode is a grid-connected operation mode or a stand-alone operation mode according to the grid voltage, and determines a photovoltaic generation status according to PV power based on the PV output voltage and current of the photovoltaic cell in each of the grid-connected operation mode and the stand-alone operation mode, and performs one of preset first and second grid-connected control modes and first and second stand-alone control modes,
wherein the first grid-connected control mode is a control mode in which photovoltaic generation is not carried out in the grid-connected operation mode, the second grid-connected control mode is a control mode in which photovoltaic generation is carried out in the grid-connected operation, the first stand-alone control mode is a control mode in which photovoltaic generation is carried out in the stand-alone operation mode without a grid connection, and the second stand-alone control mode is a control mode in which photovoltaic generation is not carried out in the stand-alone operation mode without a grid connection.

17. The PV-FC hybrid generation system of claim 15, wherein the converter controller comprises:
a first calculation part calculating a first control error value for constant power control with respect to the DC/DC converter unit in the first grid-connected control mode;
a first control value compensation part compensating a converter control value by using the first control error value from the first calculation part; and
a first PWM control part generating a PWM converter control signal by using the compensated converter control value from the first control value compensation part, and controlling an operation of the DC/DC converter unit by using the PWM converter control signal.

18. The PV-FC hybrid generation system of claim 17, wherein the inverter controller comprises:
a second calculation part calculating a second control error value for DC link, grid connection and output current control with respect to the DC/AC inverter unit in the first grid-connected control mode;
a second control value compensation part compensating an inverter control value by using the second control error value from the second calculation part; and
a second PWM control part generating a PWM inverter control signal by using the compensated inverter control value from the second control value compensation part, and controlling an operation of the DC/AC inverter unit by using the PWM inverter control signal.

19. The PV-FC hybrid generation system of claim 18, wherein the first calculation part of the converter controller generates an FC current command value by dividing a preset FC power command value by the FC output voltage in the first grid-connected control mode, and calculates the first control error value corresponding to a difference value between the FC current command value and the FC current.

20. The PV-FC hybrid generation system of claim 19, wherein the second calculation part of the inverter controller comprises:
a DC link calculation portion calculating a current error value corresponding to a difference value between a preset DC voltage command value and the DC voltage in the first grid-connected control mode, and compensating a current command value by using the current error value;
an error correction portion calculating a current correction value by dividing a preset FC power command value by the grid voltage, and correcting the compensated current command value from the DC link calculation portion by using the current correction value;

a DC/AC conversion portion detecting a phase of the grid voltage, and converting the current command value of the error correction portion into an AC output current command value by synchronizing the current command value with the detected phase; and an error calculation portion generating the second control error value corresponding to a difference value between the output current command value from the DC/AC conversion portion and the output current.

21. The PV-FC hybrid generation system of claim 15, wherein the converter controller comprises:

a first calculation part calculating a first control error value for constant power control with respect to the DC/DC converter unit in the second grid-connected control mode;

a first control value compensation part compensating a converter control value by using the first control error value from the first calculation part; and a first PWM control part generating a PWM converter control signal by using the compensated converter control value from the first control value compensation part, and controlling an operation of the DC/DC converter unit by using the PWM converter control signal.

22. The PV-FC hybrid generation system of claim 21, wherein the inverter controller comprises:

a second calculation part calculating a second control error value for maximum power point tracking (MPPT), DC link and grid connection and output current control with respect to the DC/AC inverter unit in the second grid-connected control mode;

a second control value compensation part compensating an inverter control value by using the second control error value from the second calculation part; and a second PWM control part generating a PWM inverter control signal by using the compensated inverter control value from the second control value compensation part, and controlling an operation of the DC/AC inverter unit by using the PWM inverter control signal.

23. The PV-FC hybrid generation system of claim 22, wherein the first calculation part of the converter controller generates an FC current command value by dividing a preset FC power command value by the FC output voltage in the second grid-connected control mode, and calculates the first control error value corresponding to a difference value between the FC current command value and the FC current.

24. The PV-FC hybrid generation system of claim 23, wherein the second calculation part of the inverter controller comprises:

an MPPT portion generating a PV output voltage command value by performing preset MPPT by using the PV output voltage and current in the second grid-connected control mode;

a DC link calculation portion calculating a voltage error value corresponding to a difference value between the PV output voltage and the PV output voltage command value, and compensating an output current command value by using the voltage error value;

an error correction portion calculating a power command value by adding a preset FC power command value and a preset PV power command value, calculating a current correction value by dividing the power command value by the grid voltage, and correcting the compensated output current command value from the DC link calculation portion by using the current correction value;

a DC/AC conversion portion detecting a phase of the grid voltage, and converting the corrected current command value into an AC output current command value by synchronizing the current command value into an AC output current command value; and an error calculation portion generating the second control error value corresponding to a difference value between the output current command value from the DC/AC conversion portion and the output current.

25. The PV-FC hybrid generation system of claim 15, wherein the converter controller comprises:

a first calculation part calculating a first control error value with respect to the DC/DC converter unit in the first stand-alone control mode;

a first control value compensation part compensating a converter control value by using the first control error value from the first calculation part; and a first PWM control part generating a PWM converter control signal by using the compensated converter control value from the first control value compensation part, and controlling an operation of the DC/DC converter unit by using the PWM converter control signal.

26. The PV-FC hybrid generation system of claim 25, wherein the inverter controller comprises:

a second calculation part calculating a second control error value for MPPT, DC link and output constant voltage control with respect to the DC/AC inverter unit in the first stand-alone control mode;

a second control value compensation part compensating an inverter control value by using the second control error value from the second calculation part; and a second PWM control part generating a PWM inverter control signal by using the compensated inverter control value from the second control value compensation part, and controlling an operation of the DC/AC inverter unit by using the PWM inverter control signal.

27. The PV-FC hybrid generation system of claim 26, wherein the first calculation part of the converter controller generates an FC current command value by dividing a preset FC power command value by the FC output voltage in each of the first grid-connected control mode, the second grid-connected control mode and the first stand-alone control mode, and calculates the first control error value corresponding to a difference value between the FC current command value and the FC current.

28. The PV-FC hybrid generation system of claim 27, wherein the first calculation part of the converter controller calculates output power by using the AC voltage and output current of the DC/AC inverter unit in the first stand-alone control mode, calculates PV power by using the PV output voltage and current of the photovoltaic cell, and obtains the FC power command value corresponding to a difference value between the output power and the PV power.

29. The PV-FC hybrid generation system of claim 28, wherein the second calculation part of the inverter controller comprises:

a maximum power point tracking (MPPT) portion generating a PV output voltage command value by performing preset MPPT by using the PV output voltage and current in the first stand-alone control mode;

a DC link calculation portion calculating a voltage error value corresponding to a difference value between the PV output voltage and the PV output voltage command value, and compensating an output voltage command value by using the voltage error value;

a DC/AC conversion portion converting the output voltage command value from the DC link calculation portion into an AC output voltage command value; and an error calculation portion generating the second control error value corresponding to a difference value between the output voltage command value from the DC/AC conversion value and the output voltage.

30. The PV-FC hybrid generation system of claim 15, wherein the converter controller comprises:

a first calculation part calculating a first control error value for DC link control with respect to the DC/DC converter unit in the second stand-alone control mode;

a first control value compensation part compensating a converter control value by using the first control error value from the first calculation part; and a first PWM control part generating a PWM converter control signal by using the compensated converter control value from the first control value compensation part, and controlling an operation of the DC/DC converter unit by using the PWM converter control signal.

31. The PV-FC hybrid generation system of claim 30, wherein the inverter controller comprises:

a second calculation part calculating a second control error value for output constant voltage control with respect to the DC/AC inverter unit in the second stand-alone control mode;

a second control value compensation part compensating an inverter control value by using the second control error value from the second calculation part; and a second PWM control part generating a PWM inverter control signal by using the compensated inverter control value from the second control value compensation part, and controlling an operation of the DC/AC inverter unit by using the PWM inverter control signal.

32. The PV-FC hybrid generation system of claim 31, wherein the first calculation part of the converter controller calculates a voltage error value corresponding to a difference value between a preset DC voltage command value and the DC voltage in the second stand-alone control mode, compensates a preset FC current command value by using the voltage error value, and calculates the first control error value corresponding to a difference value between the compensated FC current command value and the FC current.

33. The PV-FC hybrid generation system of claim 32, wherein the second calculation part of the inverter controller generates the second control error value corresponding to a difference value between the AC voltage command value and the AC voltage in the second stand-alone control mode.

34. A photovoltaic and fuel cell (PV-FC) hybrid generation system comprising:

a DC/DC converter unit converting an FC output voltage from a fuel cell into a preset voltage;

a DC link unit commonly connecting an output terminal of a photovoltaic cell and an output terminal of the DC/DC converter unit, and linking the converted FC output voltage from the DC/DC converter unit with a PV output voltage from the photovoltaic cell to thereby generate a DC voltage;

a DC/AC inverter unit converting the DC voltage from the DC link unit into a preset AC voltage;

a voltage/current detection unit detecting a voltage and a current generated by each of the fuel cell, the photovoltaic cell and the DC/AC inverter unit; and a hybrid generation control unit controlling operations of the DC/DC converter unit and the DC/AC inverter unit on the basis of a plurality of voltages and currents detected by the voltage/current detection unit, wherein the voltage/current detection unit detects the FC output voltage and current of the fuel cell, the PV output voltage and current of the photovoltaic cell, the AC voltage and output current of the DC/AC inverter unit, and a grid voltage from a grid of a commercial power supply, the hybrid generation control unit comprises:

a converter controller controlling an operation of the DC/DC converter unit by using the grid voltage, and the FC output voltage and current; and an inverter controller controlling an operation of the DC/AC inverter unit on the basis of the PV output voltage and current from the voltage/current detection unit, in a grid-connected operation mode, the converter controller and the inverter controller each determine a photovoltaic generation status according to PV power based on the PV output voltage and current of the photovoltaic cell, and perform one of preset first and second grid-connected control modes according to the determined photovoltaic generation status regarding whether or not photovoltaic generation is carried out, the first grid-connected control mode is a control mode in which photovoltaic generation is not carried out in the grid-connected operation mode, and the second grid-connected control mode is a control mode in which photovoltaic generation is carried out in the grid-connected operation mode, the converter controller comprises:

a first calculation part calculating a first control error value for constant power control with respect to the DC/DC converter unit in the first grid-connected control mode;

a first control value compensation part compensating a converter control value by using the first control error value from the first calculation part; and a first PWM control part generating a PWM converter control signal by using the compensated converter control value from the first control value compensation part, and controlling an operation of the DC/DC converter unit by using the PWM converter control signal, the inverter controller comprises:

a second calculation part calculating a second control error value for DC link, grid connection and output current control with respect to the DC/AC inverter unit in the first grid-connected control mode;

a second control value compensation part compensating an inverter control value by using the second control error value from the second calculation part; and a second PWM control part generating a PWM inverter control signal by using the compensated inverter control value from the second control value compensation part, and controlling an operation of the DC/AC inverter unit by using the PWM inverter control signal, the first calculation part of the converter controller generates an FC current command value by dividing a preset FC power command value by the FC output voltage in each of the first grid-connected control mode, the second grid-connected control mode and a first stand-alone control mode, and calculates the first control error value corresponding to a difference value between the FC current command value and the FC current.

35. The PV-FC hybrid generation system of claim 34, wherein the second calculation part of the inverter controller comprises:

a DC link calculation portion calculating a current error value corresponding to a difference value between a preset DC voltage command value and the DC voltage in the first grid-connected control mode, and compensating a current command value by using the current error value;

an error correction portion calculating a current correction value by dividing the preset FC power command value by the grid voltage, and correcting the compensated current command value from the DC link calculation portion by using the current correction value;

a DC/AC conversion portion detecting a phase of the grid voltage, and converting the current command value from the error correction portion by synchronizing the current command value with the detected phase; and an error calculation portion generating the second control error value corresponding to a difference value between the output current command value from the DC/AC conversion portion and the output current.

* * * * *